US010725591B1

(12) United States Patent
Maharyta et al.

(10) Patent No.: US 10,725,591 B1
(45) Date of Patent: Jul. 28, 2020

(54) PASSIVE TOUCH DETECTION FOR CAPACITIVE SENSE ARRAY

(71) Applicant: CYPRESS SEMICONDUCTOR CORPORATION, San Jose, CA (US)

(72) Inventors: Andriy Maharyta, Lviv (UA); Oleksandr Karpin, Lviv (UA); Hans Klein, Pleasanton, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 648 days.

(21) Appl. No.: 14/668,822

(22) Filed: Mar. 25, 2015

Related U.S. Application Data

(60) Provisional application No. 61/986,673, filed on Apr. 30, 2014, provisional application No. 62/042,675, filed on Aug. 27, 2014.

(51) Int. Cl.
 *G06F 3/044* (2006.01)
(52) U.S. Cl.
 CPC .................... *G06F 3/044* (2013.01)
(58) Field of Classification Search
 USPC .................. 345/173–179; 178/18.01–20.04; 324/600–690, 519
 See application file for complete search history.

(56) References Cited

U.S. PATENT DOCUMENTS

| | | | | |
|---|---|---|---|---|
| 8,294,687 B1 * | 10/2012 | Ksondzyk | ..................... | 345/173 |
| 8,874,396 B1 | 10/2014 | Olson et al. | | |
| 2005/0189154 A1 * | 9/2005 | Perski et al. | ................ | 178/18.06 |
| 2010/0139991 A1 * | 6/2010 | Philipp et al. | ............. | 178/18.06 |
| 2012/0001859 A1 * | 1/2012 | Kim et al. | ..................... | 345/173 |
| 2012/0049869 A1 * | 3/2012 | Kremin | ................. | G06F 3/0412 324/679 |
| 2012/0200524 A1 * | 8/2012 | Vallis et al. | ................... | 345/174 |
| 2012/0268415 A1 * | 10/2012 | Konovalov et al. | .......... | 345/174 |
| 2013/0063388 A1 * | 3/2013 | Ningrat | ........................ | 345/174 |
| 2013/0176270 A1 | 7/2013 | Cattivelli et al. | | |
| 2013/0257797 A1 * | 10/2013 | Wu et al. | ...................... | 345/174 |
| 2014/0022188 A1 | 1/2014 | Ahn | | |
| 2014/0022203 A1 | 1/2014 | Karpin et al. | | |
| 2014/0152621 A1 * | 6/2014 | Okayama et al. | ............ | 345/174 |
| 2014/0176496 A1 | 6/2014 | Azumi et al. | | |
| 2014/0204058 A1 * | 7/2014 | Huang et al. | ................. | 345/174 |

OTHER PUBLICATIONS

Simon Voelker et al., "PUCs: Detecting Transparent, Passive Untouched Capacitive Widgets on Unmodified Multi-touch Displays" 4 pages.

* cited by examiner

*Primary Examiner* — Roberto W Flores
(74) *Attorney, Agent, or Firm* — Lowenstein Sandler LLP

(57) ABSTRACT

A processing device scans a capacitive sense array to determine a characteristic of a noise signal. A processing device further detects a location of a touch proximate to the capacitive sense array by a passive touch object using a first mode of capacitance touch detection. The first mode of capacitive touch detection uses a capacitive coupling of the noise signal to the capacitive sense array through the passive touch object to detect the touch.

19 Claims, 15 Drawing Sheets

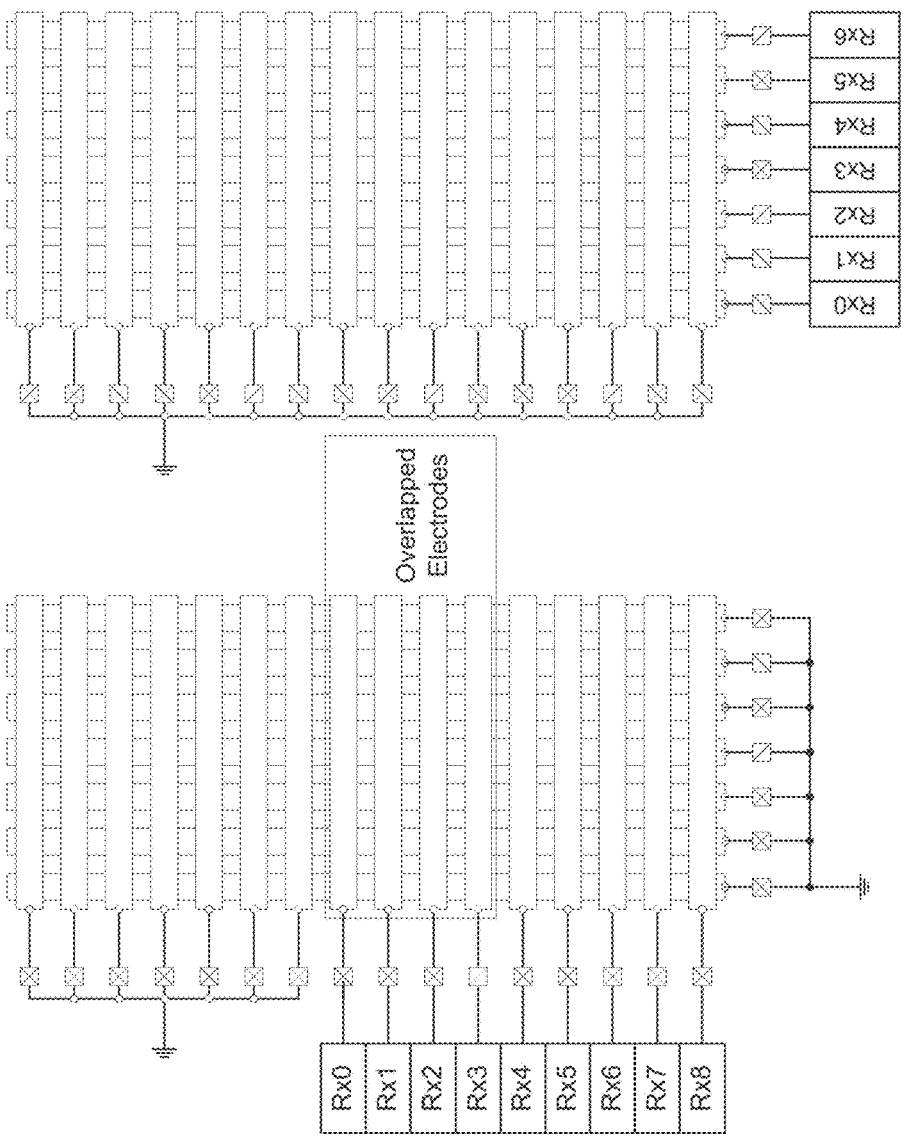
FIG. 5C
FIG. 5B
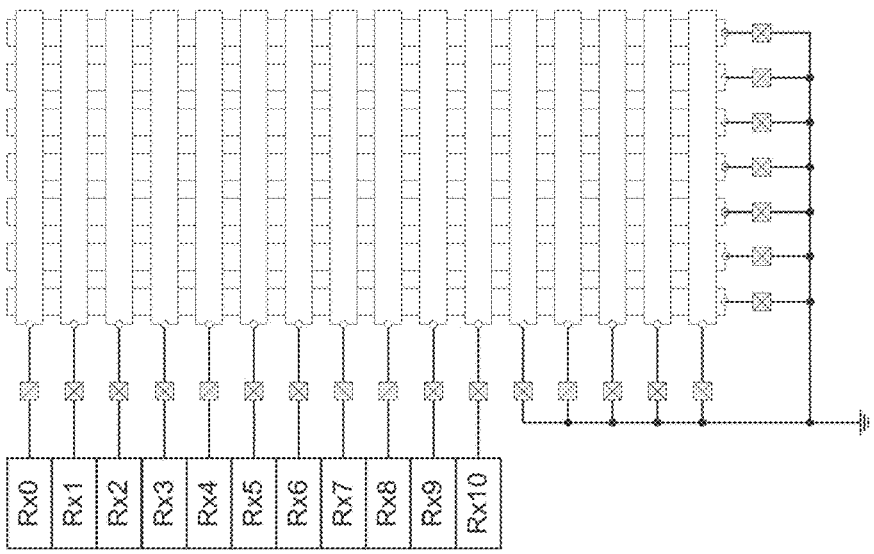
FIG. 5A

PASSIVE TOUCH DETECTION FOR CAPACITIVE SENSE ARRAY

RELATED APPLICATIONS

This application claims the benefit of U.S. Provisional Application No. 61/986,673 filed on Apr. 30, 2014 and U.S. Provisional Application No. 62/042,675 filed Aug. 27, 2014, the contents of which are hereby incorporated by reference herein.

TECHNICAL FIELD

This disclosure relates to the field of sensing systems and, in particular, to a capacitance sensing system.

BACKGROUND

Computing devices, such as notebook computers, personal data assistants (PDAs), mobile communication devices, portable entertainment devices (such as handheld video game devices, multimedia players, and the like), and set-top-boxes (such as digital cable boxes, digital video disc (DVD) players, and the like) may have user interface devices, which are also known as human interface devices (HID), that facilitate interaction between the user and the computing device. One type of user interface device that has become more common is a sensing system that operates by way of capacitance sensing. A capacitance sensing system may include a processing device and an array of one or more capacitive sense electrodes of a capacitive sense array. The capacitance detected of the capacitive sense array by a processing device may change as a function of the proximity of a touch object to the capacitive sense array.

BRIEF DESCRIPTION OF THE DRAWINGS

The present disclosure is illustrated by way of example, and not by way of limitation, in the figures of the accompanying drawings.

FIG. 5A is a diagram illustrating a configuration of a capacitive sense array used for passive touch detection, according to another embodiment.

FIG. 5B is a diagram illustrating a configuration of a capacitive sense array used for passive touch detection, according to another embodiment.

FIG. 5C is a diagram illustrating a configuration of a capacitive sense array used for passive touch detection, according to another embodiment.

DETAILED DESCRIPTION

Figure 1:
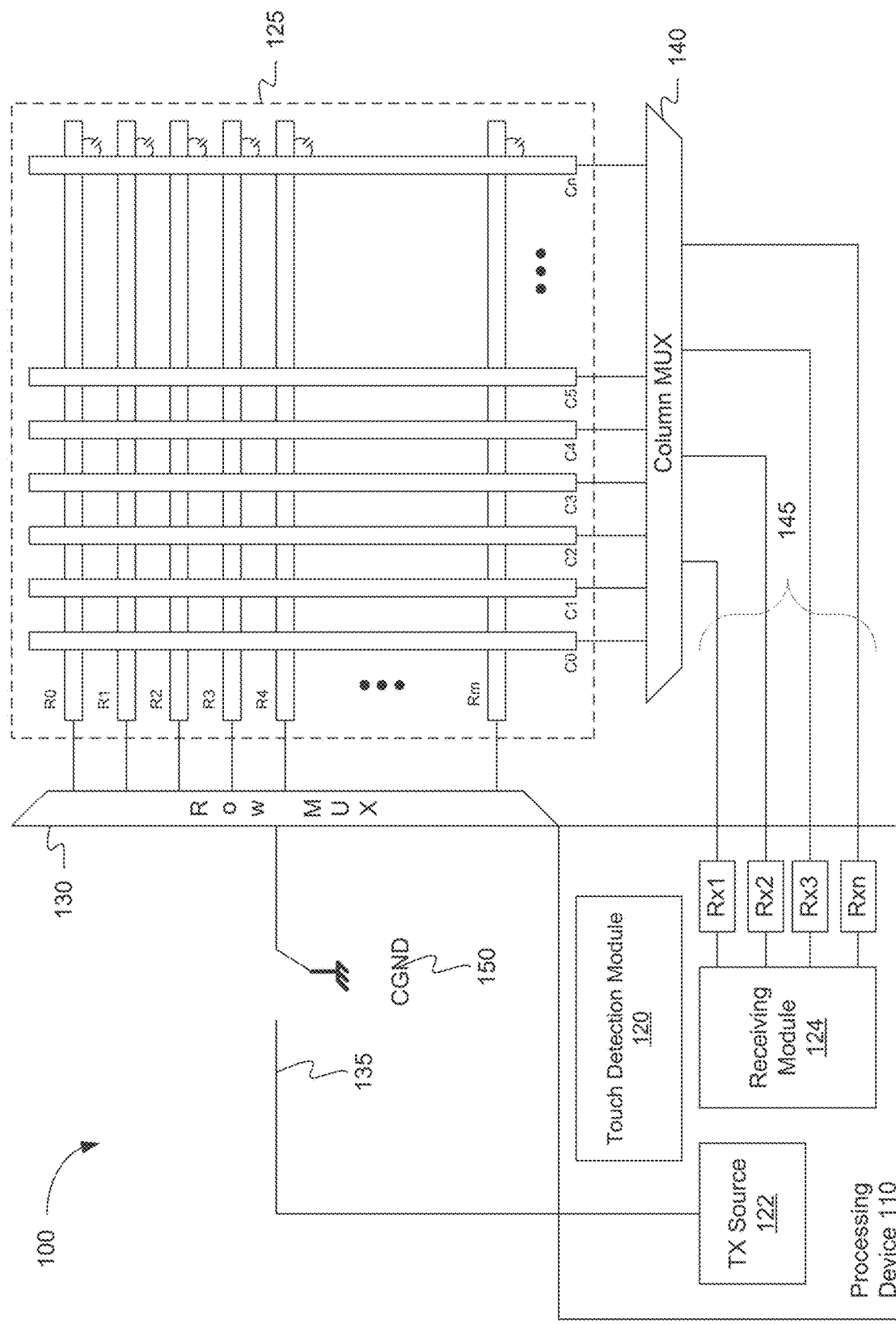
FIG. 1 is a block diagram illustrating a capacitance sensing system, according to an embodiment.

Noise signals present in a sensing system, such as a capacitance sensing system, may cause errors in detection of a touch. An error may include an incorrect touch location, a false touch (i.e., a touch detected where no actual touch exists) and/or a dropped touch (i.e., an actual touch is undetected). Many noise suppression techniques, such as filtering, and noise avoidance techniques, such as frequency hopping, and/or increasing sensing signal levels, may be insufficient, costly, and/or may increase power consumption.

The present disclosure addresses the above-mentioned and other deficiencies by sensing a touch by a passive touch object proximate a capacitive sense array using a capacitive coupling of a noise signal to the capacitive sense array through a passive touch object to detect the touch.

A noise signal (also referred to as "noise") refers to an undesirable and/or randomly fluctuating electric signal unintended for the purpose of sensing a touch. A noise signal may be generated from one or more noise sources. The noise signal may terminate at a ground potential of a source of the noise signal, such as earth ground. Two examples of noise are charger noise, such as from a charger used to charge a battery in an electronic device, and display noise, such as from a display located in the electronic device. Charger noise may be capacitively coupled (e.g., through a coupling capacitor between the passive touch object and capacitive sense array) into one or more electrodes of a capacitive sense array. Charger noise may be multiplicative noise in that it affects the electrodes of the capacitive sense array proportionally to the capacitance measured at each electrode. Thus, the charger noise may be higher on electrodes that are closer to the center position of a touch (i.e., because of a larger coupling capacitor) and less on electrodes that are further away (i.e., because of a smaller coupling capacitor). Display noise may be coupled across the entire surface of capacitive sense array by the display (e.g., a liquid crystal display (LCD)). Display noise may be additive noise in that it affects all electrodes of the capacitive sense array equally, irrespective of the presence of a passive touch object. In other embodiments, other sources of noise may generate a noise signal that affects the sensing of a touch.

Passive touch object refers to a conductive item physically unconnected (e.g., lacking an electric wire, electric cable, etc.) to a power source (e.g., battery, physical capacitor, etc.) and/or a conductive item unable to generate and/or store an electric signal. In one example, a passive touch object may be a part of a human body, such a human hand and/or human finger. In another example, a passive touch object may be a passive stylus.

Capacitive coupling refers to a transfer of energy, such as via a noise signal, from one circuit to another circuit by a coupling capacitor (e.g., capacitor). In one example, a noise signal may be transferred from a passive touch object, such as a finger, to one or more electrodes of a capacitive sense array through a coupling capacitor formed at an intersection between the passive touch object and the capacitive sense array (e.g., one or more electrodes of the capacitive sense array). The capacitive coupling of the noise signal through the passive touch object and capacitive sense array may terminate at a ground potential of a source of the noise signal, such as earth ground. It should be noted that a direction of noise signal path described as transferred from a passive touch object to one or more electrodes is used for illustration, and not for limitation. For example, a noise signal may also be transferred from one or more electrodes of a capacitive sense array to a passive touch object through a coupling capacitor formed at an intersection between the passive touch object and the capacitive sense array.

A transmission signal (also referred to as TX signal) refers to a controlled electric signal intended for the purpose of sensing a touch. A transmission signal may be used in capacitance sensing (e.g., mutual capacitance touch detection). A transmission signal may be purposefully generated to drive one or more transmission electrodes of a capacitive sense array. A transmission signal may terminate to a ground potential, such as common ground of electrical device (e.g., mobile phone). A transmission electrode may have a corresponding receiving electrode to receive the transmission signal.

In one embodiment, a capacitive sense array may be scanned to determine a characteristic of a noise signal. In one example, the transmission signals of the capacitive sense array may be turned off and one or more receive channels may be scanned for the presence of a noise signal (also referred to as a "listening scan" or "listening mode").

In another embodiment, if a characteristic of a noise signal is detected, a processing device may detect a location of a touch proximate to the capacitive sense array by a passive touch object using a first mode of capacitance touch detection (also referred to as "passive touch detection") that uses a capacitive coupling of the noise signal to the capacitive sense array through the passive touch object in lieu of a transmission signal.

In one embodiment, using passive touch detection to detect a touch may include scanning a first plurality of electrodes of a capacitive sense array along a first axis (e.g., vertical columns) to generate a first plurality of signal measurements indicative of the capacitive coupling of the noise signal to the first plurality of electrodes through the passive touch object. Scanning the first plurality of electrodes may include configuring a second plurality of electrodes along a second axis (e.g., horizontal columns) to a ground potential (e.g., common ground of the electronic device, such as a mobile phone) and turning off the transmission signals of the capacitive sense array. Scanning the first plurality of electrodes may further include determining at the first plurality of electrodes along the first axis the first plurality of signal measurements. The transmission signals may be turned off during the scanning of the first plurality of electrodes. The noise signal may be capacitively coupled through the passive touch object to one or more electrodes of the first plurality of electrodes. A signal measurement may be an analog value of a received signal (e.g., the noise signal capacitively coupled to an electrode of the first plurality of electrodes through a passive touch object) received at an electrode and/or a digital representation (e.g., digital count, also referred to as a count) representative of the received signal.

Using passive touch detection to detect a touch may further include comparing the first plurality of signal measurements to a touch threshold. A touch threshold may be a predetermined value used to determine if a signal measurement indicates a touch or a non-touch on a corresponding electrode (e.g., receiving electrode). If a signal measurement exceeds a touch threshold, a touch on the corresponding electrode may be inferred. If a signal measurement does not exceed a touch threshold, a non-touch on the corresponding electrode may be inferred. A determination may be made for the signal measurements of the first plurality of signal measurements that exceed the touch threshold, if the signal measurements are all of the same polarity (e.g., all positive or all negative, which may be indicative of a touch using a noise signal). If the signal measurements that exceed the threshold are all of the same polarity, a first coordinate (e.g., X axis coordinate) of the touch may be determined.

Passive touch detection to detect a touch may further include scanning a second plurality of electrodes along a second axis (e.g., horizontal columns) of the capacitive sense array to generate a second plurality signal measurements indicative of the capacitive coupling of the noise signal to the second plurality of electrodes through the passive touch object. Scanning the second plurality of electrodes may include configuring the first plurality of electrodes along the first axis (e.g., vertical columns) to a ground potential (e.g., common ground of the electronic device) and turning off the transmission signals of the capacitive sense array. Scanning the second plurality of electrodes may also include determining, at the second plurality of electrodes along the second axis, the second plurality of signal measurements when the transmission signals are turned off. The second plurality of signal measurements may correspond to the capacitive coupling of the noise signal to the second plurality of electrodes through the passive touch object.

Passive touch detection to detect a touch may further include comparing the second plurality of signal measurements to a touch threshold. A determination may be made for the signal measurements of the first plurality of signal measurement that exceed the touch threshold, to determine if the signal measurements are all of the same polarity. If the signal measurements that exceed the threshold are all of the same polarity, a second coordinate (e.g., Y axis coordinate) of the touch may be determined.

In another embodiment, a multimodal capacitance touch detection technique may be described. A first mode of capacitance touch detection (e.g., passive touch detection) or a second mode of capacitance touch detection (e.g., mutual capacitance touch detection) maybe selected in view of the characteristic of the noise signal. If the characteristic of the noise signal indicates the presence of the noise signal, the first mode of capacitance touch detection may be selected. If the characteristic of the noise signal indicates the absence of the noise signal, a second mode of capacitance touch detection may be selected. A touch proximate to the capacitive sense array may be detected using the selected mode of capacitance touch detection.

In still another embodiment, if the characteristic of the noise signal indicates the presence of the noise signal, both the first mode of capacitance touch detection (e.g., passive touch detection) and the second mode of capacitance touch detection (e.g., mutual capacitance touch detection) may be selected. Signal measurements from the second mode of capacitance touch detection indicating a touch may be rejected if corresponding signal measurements (e.g., signal measurement of the same electrode of the capacitive sense array) from the first mode of capacitance touch detection indicate a non-touch. A touch proximate the capacitive sense array by the passive touch object may be detected using the non-rejected signal measurements. Errors in position detection of a touch, such as false touch, may be reduced or eliminated by rejecting signal measurements as described above.

FIG. 1 is a block diagram illustrating a capacitance sensing system 100, according to an embodiment of the present invention. In one embodiment, system 100 includes capacitive sense array 125, processing device 110, and multiplexers 130 and 140. Processing device 110 may include touch detection module 120 that may implement one or more the features described herein. Capacitive sense array 125 may include a matrix of sense elements (e.g., capacitive sense electrodes) arranged in rows and columns (e.g., in the X and Y axes) that may be used to detect the proximity or physical contact of a passive touch object (e.g., a user's finger). In capacitive sense array 125, individual row electrodes R0-Rm and column electrodes C0-Cn are shown. In different embodiments, there may be any number of row and column electrodes in capacitive sense array 125.

Each row electrodes R0-Rm may be connected to row multiplexer 130, which may control the application of signal 135 (also referred to as a transmission signal) and or connect one or more row electrodes to a ground potential, such as common ground 150 shared by components of capacitance sensing system 100. Row multiplexer 130 may selectively apply signal 135 to one or more of row electrodes R0-Rm based on a control signal (not shown) and/or selectively apply a ground potential, such as common ground 150, to one or more or row electrodes R0-Rm. The control signal may be received from processing device 110 or from some other source. Row multiplexer 130 may apply signal 135 to (i.e., drive) a select number of row electrodes at a time (e.g., TO-T3) or may drive all row electrodes at the same time. Likewise, row multiplexer 130 may apply common ground 150 to (i.e., ground) a select number of row electrodes at a time (e.g., TO-T3) or may ground all row electrodes at the same time. The row electrodes may be driven sequentially (i.e., one at a time) with the signal 135, or a select number may be driven at the same time. Similarly, the row electrodes may be grounded sequentially (i.e., one at a time), or a select number may be grounded at the same time. In one embodiment, signal 135 is provided by transmission source 122 of processing device 110. In other embodiments, however, signal 135 may be provided by some other source.

Each of column electrodes C0-Cn may be connected to column multiplexer 140, which controls the application of received signal 145 (signal 145 may be one or more signals) to processing device 110 for measurement and processing. In one embodiment, processing device 110 includes receiving module 124. Receiving module 124 may couple to a number of receive channels Rx1, Rx2, Rx3, Rxn, each of which may be configurable to measure and process received signal 145 from one or more of column electrodes C0-Cn. A receive channel may refer to a physical medium on which an electric signal from a corresponding receiving electrode may be received and/or processed. A receive channel may include associated receive hardware, software, and/or firmware (e.g., processing device 110) to receive and process the received signal, such as signal 145, into a signal measurement (e.g., digital count). In other embodiments, any number of receive channels may be available. For example, processing device 110 may include one receive channel for each column electrode in capacitive sense array 125, thus allowing each column to be measured at the same time. In certain embodiments, however, the number of receive channels may be less than the number of receiving electrodes, thus preventing all receiving electrodes from being measured at once. Column multiplexer 140 may selectively apply received signal 145 from a number of column electrodes (e.g., C0-C3) to one receive channel (e.g., Rx1) for measurement based on a control signal (not shown). The control signal may be received from processing device 110 or from some other source. It should be noted that the description of column electrodes C0-Cn as receiving electrodes and row electrodes R0-Rm as transmission electrodes is described for illustration, and not for limitation. For example, column electrodes may be transmission electrodes and row electrodes may be receiving electrodes. In another example, in passive touch detection both column and row electrodes may be receiving electrodes as will be discussed further below.

In one embodiment, capacitive sense array 125 may be scanned to determine a characteristic of a noise signal (not shown) (also referred to as "listening scan" or "listening mode"). The signal 135 (e.g., transmission signal) may be turned off and one or more receive channels Rx1-Rxn may be scanned for the presence of a noise signal. Alternatively, both row electrodes R0-Rm and column electrodes C0-Cn may be scanned at the same window of time or different windows of time to determine a characteristic of a noise signal (also while the transmission signal is turned off). Received signal 145 may be received by processing device 110 and used to determine a signal measurement (e.g., digital counts) for each received signal 145 corresponding to a column electrode C0-Cn. The signal measurements may be compared to a noise threshold (i.e., a value of a signal measurement over which the presence of noise signal may be indicated and/or under which the absence of a noise signal may be indicated). A characteristic of a noise signal, such as the presence of noise or the absence of noise at capacitive sense array 125, may be determined from one or more signal measurements exceeding a noise threshold. If a threshold number (e.g., all or a majority) of the signal measurements exceed a noise threshold, the presence of a noise signal may be indicated. In one embodiment, for example, if a set of 3 or more signal measurements (out of a total of 5 signal measurements, for example) exceed a noise threshold, the presence of noise may be considered to be detected. If 2 or less signal measurements (out of a total of 5 signal measurements, for example) exceed a noise threshold, the absence of noise may be considered to be detected. Alternatively, other numbers of signal measurements may be used to determine whether the presence or absence of noise is considered detected.

In another embodiment, for signal measurements exceeding a noise threshold, processing device 110 may determine if the signal measurements are of the same polarity (e.g., all positive or all negative). If the signal measurements that exceed a noise threshold (e.g., all or a majority, etc.) are of the same polarity, the presence of noise may be detected. If the signal measurements that exceed the noise threshold are not of the same polarity, the absence of noise may be detected.

In one embodiment, processing device 110 may use passive touch detection (e.g., first mode of capacitance touch detection) to detect a location of a touch (and/or detect a touch) proximate a capacitive sense array using a capacitive coupling of a noise signal to the capacitive sense array 125 through the passive touch object. Detecting a location of touch proximate to the capacitive sense array may include detecting coordinates such as, X and/or Y coordinates. Detecting a touch proximate a capacitive sense array may include detecting that a touch occurred proximate to the capacitive sense array, irrespective of the location of the touch. Processing device 110 may select passive touch detection if the presence of noise is detected. In another embodiment, if the absence of noise is detected processing device 110 may use a mutual capacitance touch detection (e.g., second mode of capacitance touch detection) to measure capacitive sense array 125, where a mutual capacitance is present at the location where each transmission electrode (e.g., row) intersects (e.g., crosses) each receiving electrode (e.g., column). The magnitude of change in the mutual capacitance at one or more intersections allows processing device 110 to determine the approximate location of the passive touch object. Touch detection module 120 may implement one or more modes of capacitance touch detection.

In another embodiment, if a characteristic of the presence of noise is detected processing device 110 may select both passive touch detection and mutual capacitance touch detection. Signal measurements using passive touch detection and signal measurements using mutual capacitance touch detection may be determined by processing device 110 at different windows of time. Processing device 110 may compare the two sets of signal measurements. Processing device 110 may reject signal measurements of mutual capacitance touch detection indicating a touch if corresponding signal measurement (e.g., from the same electrode) indicate a non-touch. Processing device 110 may use the non-rejected signal measurements to detect a touch proximate to capacitive sense array 125.

In another embodiment, an example of passive touch detection is described. Using passive touch detection, a plurality of electrodes (e.g., the rows oriented parallel to the X axis and also referred to as row electrodes R0-Rm) may be configured to a ground potential, such as common ground 150, rather than configured as transmission (TX) electrodes. The transmission signal (e.g., signal 135) to the row electrodes R0-Rm may be turned off. It should be noted that for purposes of illustration and not limitation, row multiplexer 130 is illustrated as coupled to common ground 150. In another embodiment, row multiplexer 130 may be configured to couple to transmission source 122. In one embodiment, row multiplexer (MUX) 130 may be used to apply a common ground 150 to the row electrodes R0-Rm. Another set of electrodes (e.g., the columns oriented parallel to the Y axis also referred to as column electrodes C0-Cn) may be designated as receiving (RX) electrodes. The capacitive coupling of a noise signal (not shown) to capacitive sense array 125 through a passive touch object may be detected by scanning for a signal (e.g., noise signal) on each of the receiving electrodes. In one embodiment, column multiplexer 140 may be used to couple the signal received on one or more of the receiving electrodes and provide the received signal 145 back to processing device 110 to determine a plurality of signal measurements. Processing device 110 may compare the plurality of signal measurements to a touch threshold. For signal measurements of the plurality of signal measurements that exceed the touch threshold, processing device 110 may determine if the signal measurements have the same polarity. It should be noted that a common polarity, for example all (or majority) positive signal measurements or all (or majority) negative signal measurements, may indicate a presence of touch. If the signal measurements exceeding the touch threshold are a same polarity, the X coordinate of the touch may be determined.

Row multiplexer 130 and column multiplexer 140, which may be referred to as transmit multiplexer and receive multiplexer respectively, may be used to switch which electrodes are configured to a common ground 150 and which are used as receiving electrodes during different windows of time. For example, during a second window of time another plurality of electrodes (e.g., the columns oriented parallel to the Y axis and also referred to as column electrodes C0-Cn) may be configured to a ground potential, such as common ground 150. The transmission signal to the column electrodes C0-Cn may be turned off. Column multiplexer (MUX) 140 may be used to apply a common ground 150 to the column electrodes C0-Cn. The plurality of row electrodes (e.g., the rows oriented parallel to the X axis also referred to as row electrodes R0-Rm) may be designated as receiving (RX) electrodes. The capacitive coupling of a noise signal (not shown) to capacitive sense array 125 through a passive touch object may be detected by scanning for a signal (e.g., noise signal) on each of the row electrodes R0-Rm. In one embodiment, row multiplexer 130 may be used to couple the signal received on one or more of the row electrodes R0-Rm and provide the received signal 135 back to processing device 110 to determine a plurality of signal measurements. Processing device 110 may compare the plurality of signal measurements to a touch threshold. For signal measurements of the plurality of signal measurements that exceed the touch threshold, processing device 110 may determine if the signal measurements have the same polarity. It should be noted that a common polarity, for example all (or a majority) positive signal measurements or all (or a majority) negative signal measurements, may indicate a presence of touch. If the signal measurements exceeding the touch threshold are a same polarity, the Y coordinate of the touch may be determined.

The designation of rows along an X axis and columns along a Y axis is described for purposes of illustration rather than limitation. In other embodiments, the rows and columns may be reversed, for example. The depiction of an X axis and Y axis being orthogonal is used for purposes of illustration rather than limitation. In another embodiment, the X axis and Y axis may be oriented at any angle relative to one another. For example, the X axis may be oriented in a diagonal fashion with respect to the Y axis. Determining the X coordinate prior to the Y coordinate is described for purposes of illustration rather than limitation. In other embodiments, the Y coordinate may be determined prior to or at approximately the same time as determining the X coordinate.

Scanning column electrodes C0-Cn prior to scanning row electrodes R0-Rm is described for purposes of illustration rather than limitation. In another embodiment, processing device 110 may scan row electrodes R0-Rm prior to column electrodes C0-Cn. Scanning column electrodes C0-Cn in a different window of time than scanning row electrodes R0-Rm is described for purposes of illustration rather than limitation. In other embodiments, scanning of rows and columns may occur at approximately the same time. For example, if enough receive channels are available, all rows and columns may be scanned during a same window of time to detect a touch using passive touch detection. In another embodiment, some of the row electrodes R0-Rm (or column electrodes C0-Cn) may be scanned at a window time and other row electrodes R0-Rm (or column electrodes C0-Cn) may be scanned at a different window of time. In still another embodiment, two overlapping sections of rows electrodes may be scanned at two different windows of time while the columns may be scanned at still another window of time, as will be described below.

In one embodiment, passive touch detection may be used to scan a first set of row electrodes (or first set of column electrodes) during a first window of time and a second set of row electrodes (or second set of column electrodes) during a second window of time. The first set of row electrodes and the second set of row electrodes may partially overlap. In some cases, the number of rows R0-Rm or columns C0-Cn in a capacitive sense array 125 may outnumber the number of receive channels Rx1-RxN in processing device 110. In such a situation, the processing device 110 may not be able to scan all of the rows or all of the columns in a single window of time. Accordingly, processing device 110 may scan the electrodes along one or both axes of capacitive sense array 125 over multiple windows of time.

For example, capacitive sense array 125 may have Rm rows (e.g., 11 rows) and Cn columns (e.g., 20 columns). In this example, the processing device 110 may include Rxn receive channels (e.g., 11 receive channels), which is enough to scan the 11 rows in a single window of time, but not the 20 columns. In one embodiment during a first window of time, columns 1-11 are scanned and during a second window of time, columns 10-20 are scanned. Thus, there is an overlap of at least two electrodes (e.g., columns 10 and 11) between the two windows of time. Row electrodes may be scanned in similar manner as described above. A touch may be determined using the signal measurements of all three scans in a similar manner as described above.

In one embodiment, an example of mutual capacitance touch detection is described. Using mutual capacitance touch detection (e.g., second mode of capacitive touch detection), one set of electrodes (e.g., the rows oriented parallel to the X axis also referred to as row electrodes R0-Rm) may be designated as transmission (TX) electrodes. The transmission electrodes may be driven with an electric signal 135 (e.g., transmission signal) provided by processing device 110. In one embodiment, row multiplexer (MUX) 130 may be used to apply the electric signal 135 to one or more of the transmission electrodes. Another set of electrodes (e.g., the columns oriented parallel to the Y axis also referred to as column electrodes C0-Cn) are designated as receiving (RX) electrodes. The mutual capacitance at the intersections between the driven rows and columns may be measured by sampling a signal on each of the receiving electrodes. In one embodiment, column multiplexer 140 may be used to couple the signal received on one or more of the receiving electrodes and provide the received signal 145 back to processing device 110 for measurement. Processing device 110 may use receive signal 145 to determine a plurality of signal measurements (e.g., digital counts) corresponding to a mutual capacitance at electrode intersections between row electrodes R0-Rm and column electrodes C0-Cn. The plurality of signal measurements may be used to determine an X coordinate of the detected touch.

Row multiplexer 130 and column multiplexer 140, which may be referred to as transmit multiplexer and receive multiplexer respectively, may be used to switch which electrodes are used as transmission electrodes and which are used as receiving electrodes during different windows of time. Accordingly, during another operation, column electrodes C0-Cn may be designated as transmission electrodes and row electrodes R0-Rm designated as receiving electrodes. Actions similar to those described above may be used to determine signal measurements used to determine the Y coordinate of the detected touch.

The designation of rows and columns as transmission and receiving electrodes is for purposes of illustration, and not of limitation. In other embodiments, the rows and columns may be reversed. In a further embodiment, the allocation of transmission and receiving electrodes may be dynamic in nature, such that for one measurement an electrode may be used as a transmission electrode, and in a following measurement occurring at a different time, the same electrode may be used as a receiving electrode.

To determine the coordinates for the position of the passive touch object using the signal measurements described above (for both passive touch detection and mutual capacitance touch detection), the processing device 110 may identify a touch position equation, from a plurality of touch position equations, and use the touch equation to determine one or more coordinates. The equations may include, for example, a centroid equation or a linear interpolation equation.

In one embodiment, the centroid equation is as follows:

$$X = \text{Pitch} \cdot \left[ i + \frac{1}{2} + \frac{S_{i+1} - S_{i-1}}{S_{i-1} + S_i + S_{i+1}} \right]$$

In the centroid equation, S may represent the signal response (or the measured capacitance) on a particular electrode. i may represent the electrode where the passive touch object, such as a finger, is located, with i+1 representing the electrode to the right of i and i−1 representing the electrode to the left. Pitch is a value based on the size of the capacitive sense array 125 and the output value X represents the X axis coordinate of the location of the passive touch object. In one embodiment, the output value X is not effected by multiplicative error, such as from a charger. The centroid equation, however, may be susceptible to additive error, such as a noise signal from a display. The same equation may be used determine the Y coordinate.

In one embodiment, the linear interpolation equation is as follows:

$$X = \text{Pitch} \cdot \left[ i + \frac{1}{2} + \frac{S_{i+1} - S_{i-1}}{2 \cdot (S_i - \min(S_{i+1}, S_{i-1}))} \right]$$

The same equation may be used determine the Y coordinate.

Figure 2:
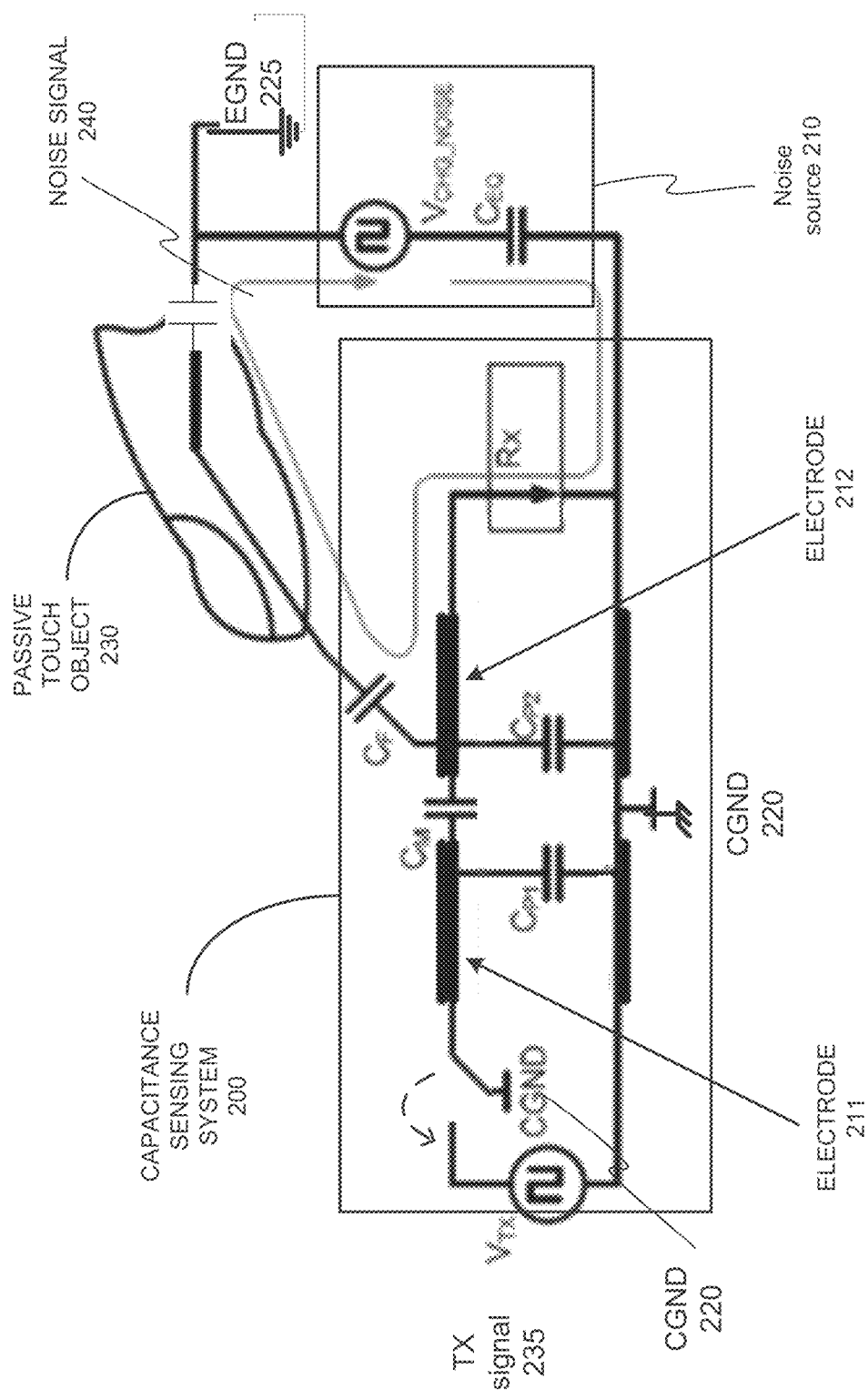
FIG. 2 illustrates a capacitance sensing system coupled to a noise source, according to one embodiment

FIG. 2 illustrates a capacitance sensing system coupled to a noise source, according to one embodiment. Capacitance sensing system 200 is coupled to noise source 210 (e.g., source of noise), for example, a charger. In another example, the noise source 210 may be an LCD display (not shown) or another noise source. Capacitance sensing system 200 includes electrode 211 and electrode 212, which may represent a transmission electrode and receiving electrode, respectively. Electrode 211 and electrode 212 may be electrodes of a capacitive sense array. The capacitance sensing system 200 includes common ground 220, which may be the ground potential of an electronic device using capacitance sensing system 200. The noise source 210 may be coupled to earth ground 225. Common ground 220 and earth ground 225 may be a different ground. When a passive touch object 230 (e.g., a finger) is placed in proximity to one of the electrodes 211 and 212, a coupling capacitance (also referred to as effective capacitance, CF) between the electrode and the passive touch object 230 with respect to earth ground 225 may be formed.

In one embodiment, the noise source 210 may be used to power the capacitance sensing system 200 and/or to charge a battery or other power source coupled to the capacitance sensing system 200. Noise source 210 may generate a noise signal 240 that is coupled to capacitance sensing system 200 with or without the presence of passive touch object 230. When the passive touch object 230 comes into proximity with capacitance sensing system 200, the passive touch object 230 may complete a circuit connection between the noise source 210 and the capacitance sensing system 200. By completing the circuit connection, a noise signal 240 generated by noise source 210 may be introduced into the capacitance sensing system 200. As illustrated, the noise signal 240 may be capacitively coupled through coupling capacitor Cf to receive electrode 212. The noise signal 240 terminates at earth ground 225, rather than common ground 220 of capacitance sensing system 200. Using passive touch detection, electrode 211 may be coupled to common ground 220. The noise signal 240 may be capacitively coupled through coupling capacitor Cf to electrode 212. Transmission signal 235 may be disconnected from electrode 211 effectively turning off transmission signal 235. The noise signal 240 may be used to detect a touch on electrode 212, as described above with respect to FIG. 1.

In another embodiment, a mutual capacitance, CM, between the electrodes 211 and 212 may exist. Using mutual capacitance touch detection, the transmission signal 235 may be connected to electrode 211 and disconnected from common ground 220. A processing device, such as processing device 110 of FIG. 1, may measure the change in capacitance CM when the passive touch object 230 is in proximity to one or more of the electrodes 211 and 212. Accordingly, as described above with respect to FIG. 1, a touch may be detected using mutual capacitance touch detection.

Figure 3:
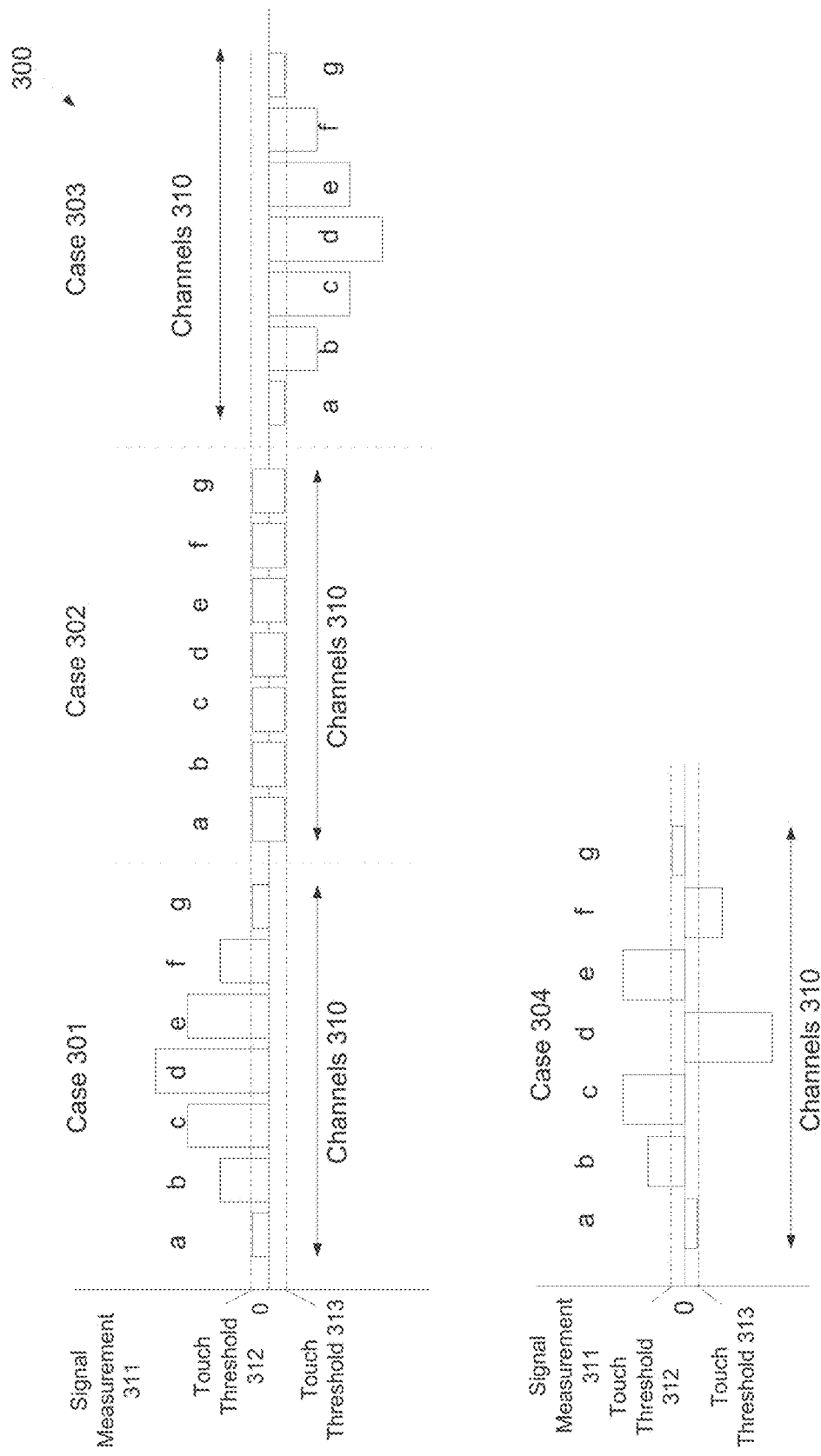
FIG. 3 is a diagram illustrating signal measurements indicative of capacitive coupling of a noise signal, according to an embodiment.

FIG. 3 is a diagram illustrating signal measurements indicative of capacitive coupling of a noise signal, according to an embodiment. Diagram 300 illustrates four cases (e.g., case 301, case 302, case 303, and case 304) of signal measurements determined using passive touch detection. The 4 cases are described for purposes of illustration, rather than limitation, as any number of cases may be present. The 4 cases show signal measurements from scanning a plurality of electrodes of the capacitive sense array while the transmission signals of the capacitive sense array are turned off, as described with respect to FIG. 1.

Signal measurement 311 represents a value (e.g., digital count) of a signal measurement determined using passive touch detection. Signal measurement 311 indicates the amount of noise signal (e.g., signal measurements) capacitively coupled into a receive channel during a scan of a plurality of receive electrodes. Channels 310 (a-g) represent different receive channels of a capacitive sense array at which signal measurement 311 was made. Touch threshold 312 represents a positive touch threshold. Touch threshold 313 represents a negative touch threshold. In case 301, all the signal measurements 311 exceeding touch threshold 312 (e.g., channels b-f) are of the same polarity (e.g., positive) which may indicate a touch. In case 302, none of the signal measurements 311 exceed touch threshold 312 or touch threshold 313 (e.g., channels a-g) which may indicate a non-touch. In case 303, all the signal measurements 311 exceeding touch threshold 313 (e.g., channels b-f) are of the same polarity (e.g., negative) which may indicate a touch. In case 304, some signal measurements 311 exceed touch threshold 312 (e.g., channels b, c, e) and some signal measurements exceed touch threshold 313 (e.g., channels d, f). Since all signal measurement 311 exceeding a touch threshold are not of the same polarity, a non-touch may be indicated.

Figure 4B:
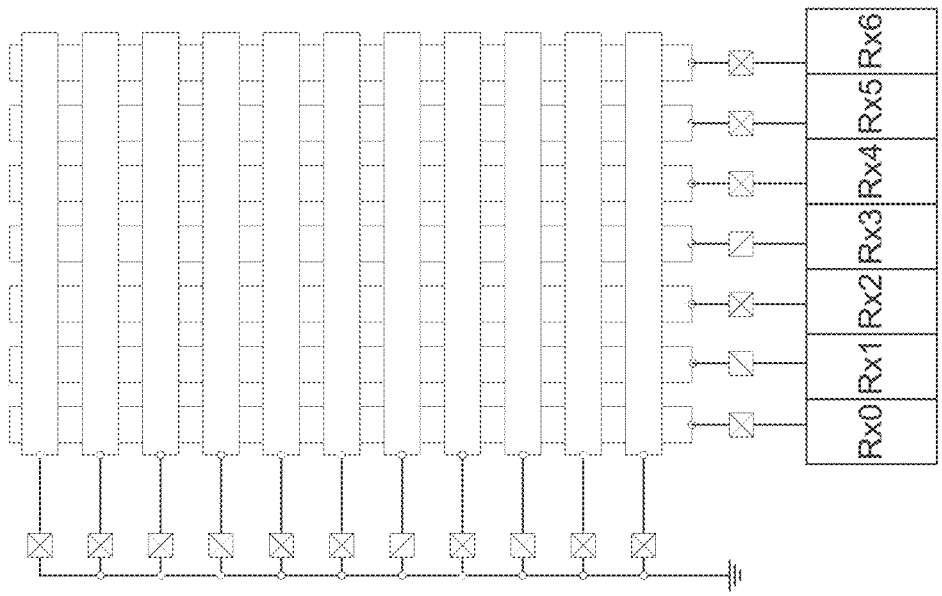
FIG. 4B is a diagram illustrating a configuration of a capacitive sense array used for passive touch detection, according to another embodiment.
Figure 4A:
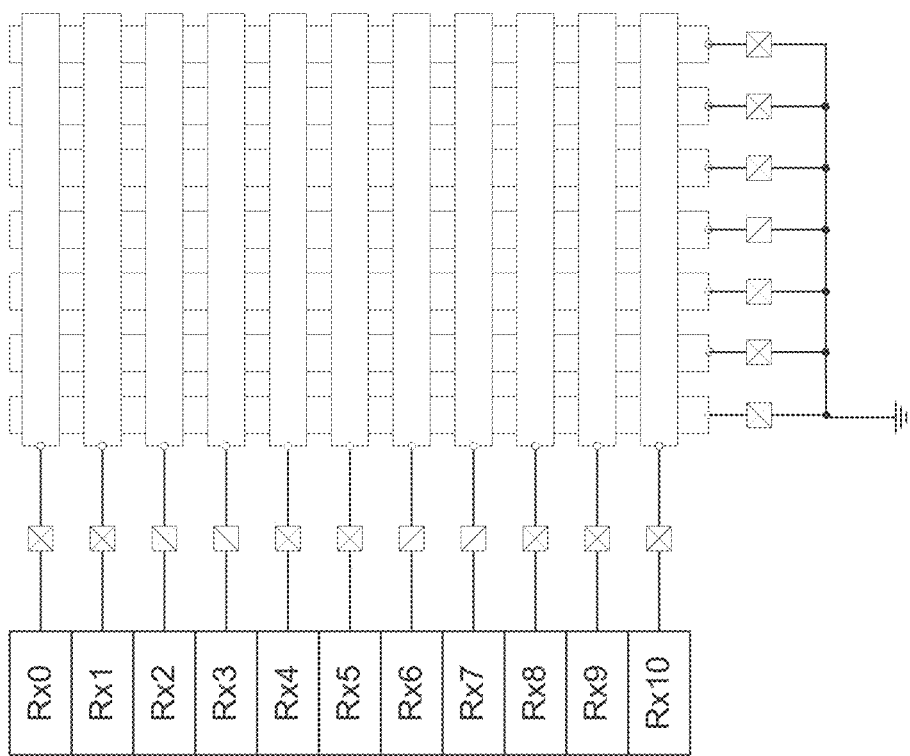
FIG. 4A is a diagram illustrating a configuration of a capacitive sense array used for passive touch detection, according to an embodiment.

FIG. 4A is a diagram illustrating a configuration of a capacitive sense array used in passive touch detection, according to an embodiment. FIG. 4B is a diagram illustrating a configuration of a capacitive sense array used in passive touch detection, according to another embodiment. As illustrated in FIGS. 4A and 4B, electrodes of capacitive sense array are arranged as row electrodes (e.g., horizontal rows) and column electrodes (e.g., vertical columns). With passive touch detection, the transmission signals of the capacitive sense array are turned off. FIG. 4A shows the configuration of the capacitive sense array during the scanning of the row electrodes to determine signal measurements indicative of the capacitive coupling of the noise signal to the row electrodes through a passive touch object. The column electrodes are configured to a ground potential, such a common ground. FIG. 4B shows a configuration of the capacitive sense array during the scanning of the column electrodes to determine signal measurements indicative of the capacitive coupling of the noise signal to the column electrodes through a passive touch object. The row electrodes are configured to a ground potential, such a common ground. It should be noted if enough receive channels are available all of the row electrodes and column electrodes may be configured as receive electrodes during scanning.

FIG. 5A, 5B, 5C are diagrams illustrating a configuration of a capacitive sense array used in passive touch detection, according to another embodiment. As illustrated in FIGS. 5A-C, electrodes of a capacitive sense array are arranged as row electrodes (e.g., horizontal rows) and column electrodes (e.g., vertical columns). With passive touch detection, the transmission signals of the capacitive sense array are turned off. FIGS. 5A and 5B show the configuration of capacitive sense array to scan the row electrodes using a first operation during a first window of time (e.g., FIG. 5A) and using a second operation during a second window of time (e.g., FIG. 5B). The configurations may be used when the number of receive channels is insufficient to scan all the rows during a single operation, for example. FIGS. 5A and 5B show the configuration of the capacitive sense array during the two different scans of the row electrodes to determine signal measurements indicative of the capacitive coupling of the noise signal to the row electrodes through a passive touch object. The column electrodes are configured to a ground potential, such a common ground, during both scans of the row electrodes. As illustrated in FIG. 5B, 4 row electrodes (Rx0-Rx3) are scanned during the first operation and the second operation (e.g., overlapped electrodes). FIG. 5C shows a configuration of the capacitive sense array during the scanning of the column electrodes to determine signal measurements indicative of the capacitive coupling of the noise signal to the column electrodes through a passive touch object. The row electrodes are configured to a ground potential, such a common ground. The signal measurements determined from the three scans may be used to detect a touch proximate the capacitive sense array.

Figure 6:
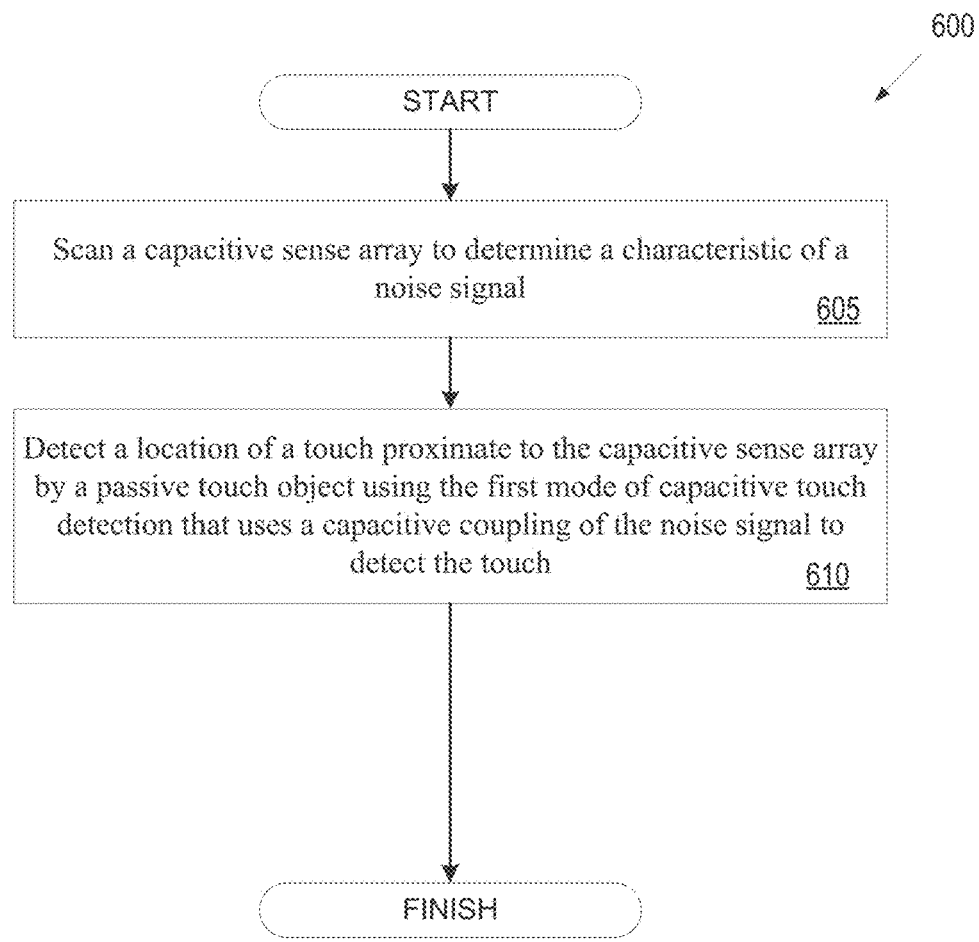
FIG. 6 is a flow diagram illustrating touch detection using passive touch detection, according to an embodiment.

FIG. 6 is a flow diagram illustrating touch detection using passive touch detection, according to an embodiment. Method 600 may be performed by processing logic that comprises hardware (e.g., circuitry, dedicated logic, programmable logic, microcode), software (e.g., instructions run on a processing device to perform hardware simulation), or a combination thereof. In one embodiment, processing device 110 and/or touch detection module 120, as shown in FIG. 1 may perform some or all the operations described herein.

Method 600 begins at block 605 where processing logic performing the method scans a capacitive sense array to determine a characteristic of a noise signal. Method 600 continues to block 610 where processing logic detects a location of a touch proximate to the capacitive sense array by a passive touch object using the first mode of capacitive touch detection (e.g., passive touch detection) that uses capacitive coupling of the noise signal to detect the touch. Additional details of method 600 may be described in reference to FIGS. 1-5C, described above.

Figure 7:
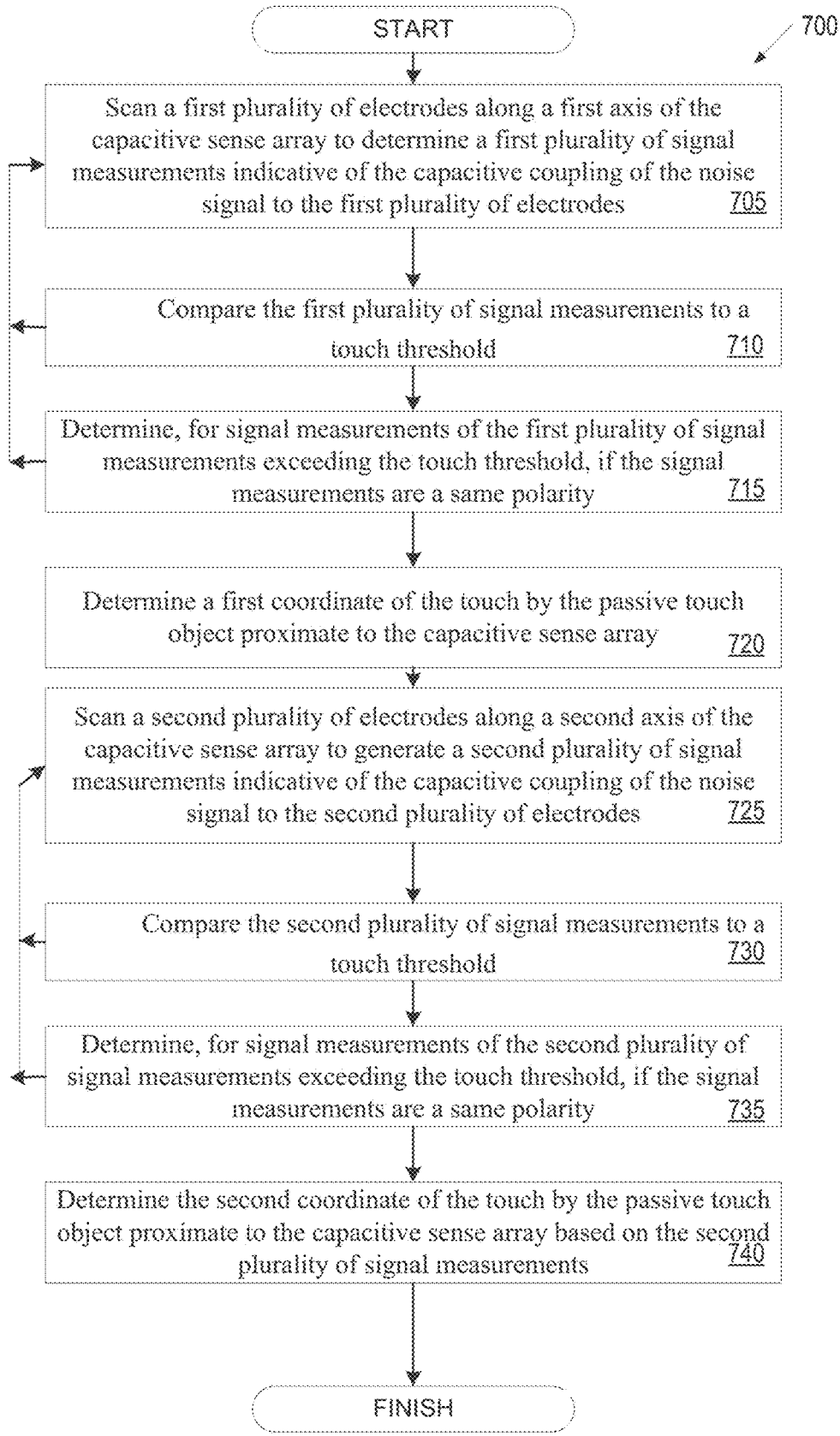
FIG. 7 is a flow diagram illustrating touch detection using passive touch detection, according to an embodiment.

FIG. 7 is a flow diagram illustrating passive touch detection, according to an embodiment. Method 700 may be performed by processing logic that comprises hardware (e.g., circuitry, dedicated logic, programmable logic, microcode), software (e.g., instructions run on a processing device to perform hardware simulation), or a combination thereof. In one embodiment, processing device 110 and/or touch detection module 120, as shown in FIG. 1 may perform some or all the operations described herein.

Method 700 begins at block 705 where processing logic performing the method, scans a first plurality of electrodes along a first axis of the capacitive sense array to determine a first plurality of signal measurements indicative of the capacitive coupling of the noise signal to the first plurality of electrodes. Method 700 continues to block 710 where processing logic compares the first plurality of signal measurements to a touch threshold. If none of the first plurality of the signal measurements exceeds the touch threshold, method 700 returns to block 705. If any of the first plurality of the signal measurements exceeds the touch threshold, method 700 proceeds to block 715. At block 715, processing logic determines, for signal measurements of the first plurality of signal measurements exceeding the touch threshold, if the signal measurements are a same polarity. If processing logic determines that the signal measurements of the first plurality of signal measurements exceeding the touch threshold are not of the same polarity, method 700 returns to block 705. If processing logic determines that the signal measurements of the first plurality of signal measurements exceeding the touch threshold are of the same polarity, method 700 proceeds to block 720. At block 720, processing logic determines a first coordinate of the touch by the passive touch object proximate to the capacitive sense array.

Method 700 continues at block 725 where processing logic scans a second plurality of electrodes along a second axis of the capacitive sense array to generate a second plurality of signal measurements indicative of the capacitive coupling of the noise signal to the second plurality of electrodes. Method 700 continues to block 730 where processing logic compares the second plurality of signal measurements to a touch threshold. If none of the second plurality of the signal measurements exceeds the touch threshold, method 700 returns to block 725. If any of the second plurality of signal measurements exceeds the touch threshold, method 700 proceeds to block 735. At block 735, processing logic determines, for signal measurements of the second plurality of signal measurements exceeding the touch threshold, if the signal measurements are a same polarity. If processing logic determines that the signal measurements of the second plurality of signal measurements exceeding the touch threshold are not of the same polarity, method 700 returns to block 725. If processing logic determines that the signal measurements of the second plurality of signal measurements exceeding the touch threshold are of the same polarity, method 700 proceeds to block 740. At block 720, processing logic determines the second coordinate of the touch by the passive touch object proximate to the capacitive sense array based on the second plurality of signal measurements. Additional details of method 700 may be described in reference to FIGS. 1-5C, described above.

Figure 8:
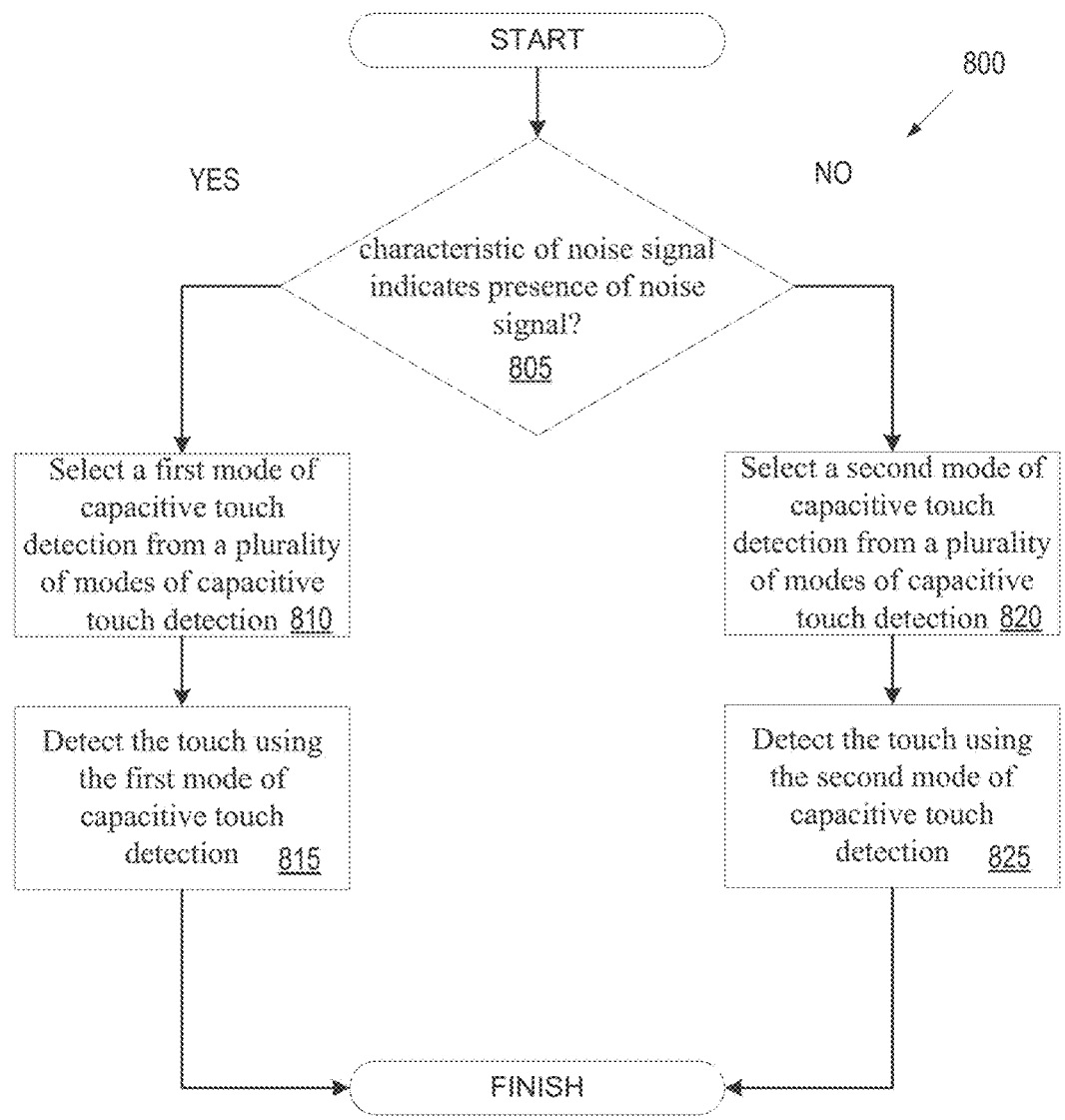
FIG. 8 is a flow diagram illustrating touch detection using multimodal capacitance touch detection, according to an embodiment.

FIG. 8 is a flow diagram illustrating touch detection using multimodal capacitance touch detection, according to an embodiment. Method 800 may be performed by processing logic that comprises hardware (e.g., circuitry, dedicated logic, programmable logic, microcode), software (e.g., instructions run on a processing device to perform hardware simulation), or a combination thereof. In one embodiment, processing device 110 and/or touch detection module 120, as shown in FIG. 1 may perform some or all the operations described herein.

Method 800 begins at block 805 where processing logic performing the method determines if the characteristic of the noise signal indicates the presence of the noise signal. If the characteristic of the noise signal indicates the presence of the noise signal on the capacitive sense array, processing logic proceeds to block 810. At block 810, processing logic selects a first mode of capacitive touch detection (passive touch detection) from a plurality of modes of capacitive touch detection. At block 815, processing logic detects the touch using the first mode of capacitive touch detection (passive touch detection).

If the characteristic of the noise signal does not indicates the presence of the noise signal on the capacitive sense array, processing logic proceeds to block 820. At 820, processing logic selects a second mode of capacitive touch detection (mutual capacitance touch detection) from a plurality of modes of capacitive touch detection. At block 825, processing logic detects the touch using the second mode of capacitive touch detection. Additional details of method 800 may be described in reference to FIGS. 1-5C, described above.

Figure 9:
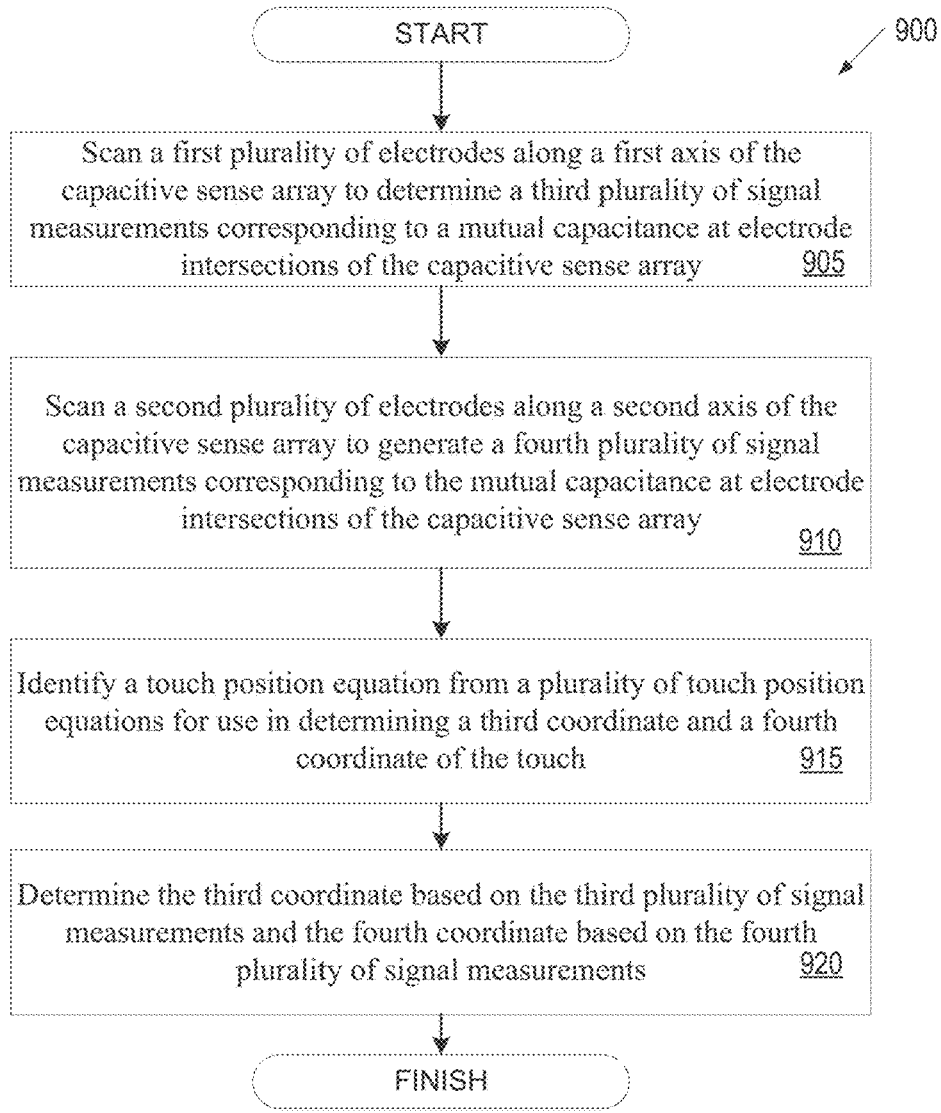
FIG. 9 is a flow diagram illustrating mutual capacitance touch detection, according to an embodiment.

FIG. 9 is a flow diagram illustrating mutual capacitance touch detection, according to an embodiment. Method 900 may be performed by processing logic that comprises hardware (e.g., circuitry, dedicated logic, programmable logic, microcode), software (e.g., instructions run on a processing device to perform hardware simulation), or a combination thereof. In one embodiment, processing device 110 and/or touch detection module 120, as shown in FIG. 1 may perform some or all the operations described herein.

Method 900 begins at block 905 where processing logic performing the method scans a first plurality of electrodes along a first axis of the capacitive sense array to determine a third plurality of signal measurements corresponding to a mutual capacitance at electrode intersections of the capacitive sense array. Method 900 proceeds to block 910 where processing logic scans a second plurality of electrodes along a second axis of the capacitive sense array to generate a fourth plurality of signal measurements corresponding to the mutual capacitance at electrode intersections of the capacitive sense array. Method 900 proceeds to block 915 where processing logic identifies a touch position equation from a plurality of touch position equations for use in determining a third coordinate and a fourth coordinate of the touch.

Method 900 proceeds to block 920 where processing logic determines the third coordinate based on the third plurality of signal measurements and the fourth coordinate based on the fourth plurality of signal measurements. Additional details of method 900 may be described in reference to FIGS. 1-5C, described above.

Figure 10:
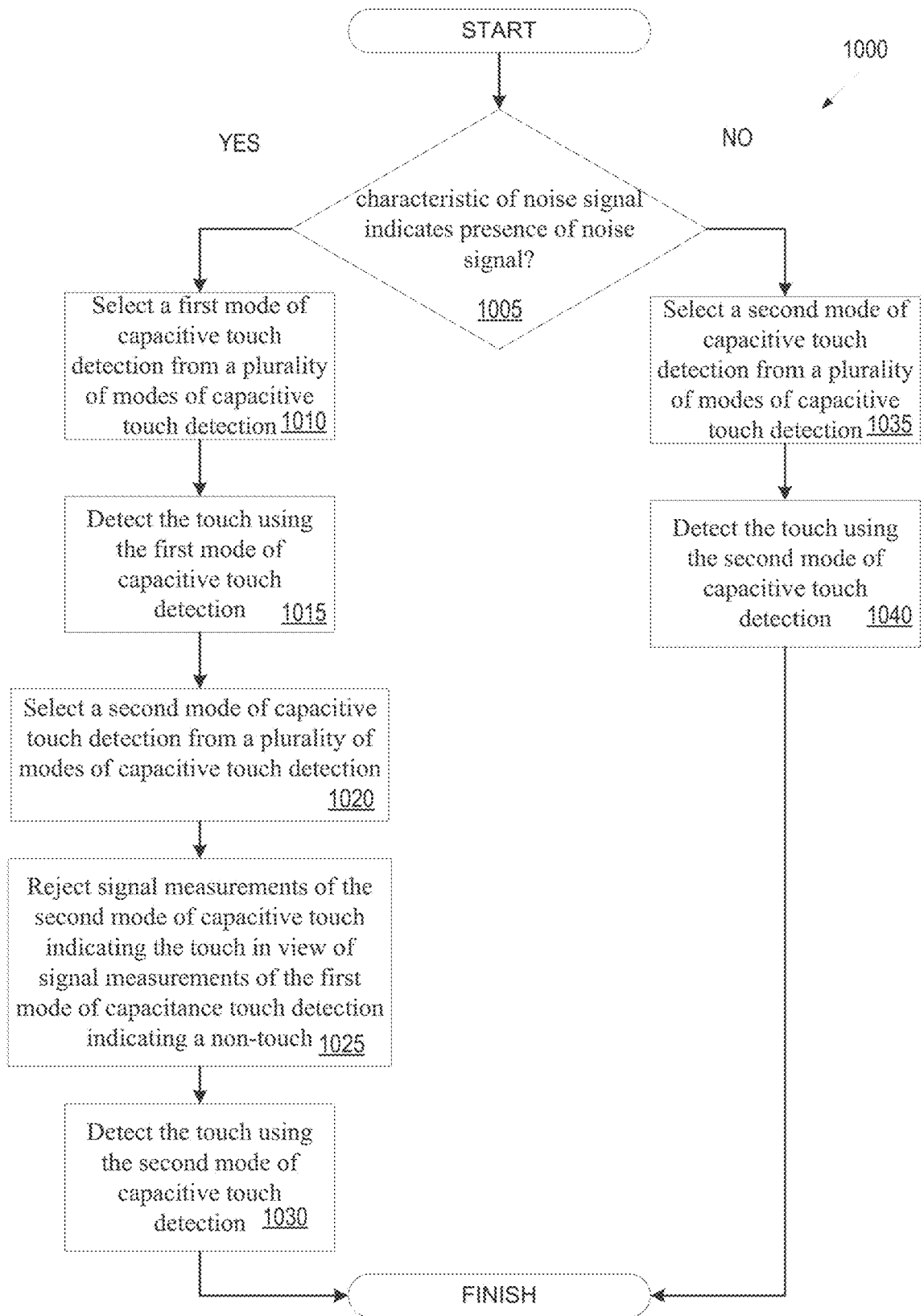
FIG. 10 is a flow diagram illustrating touch detection using multimodal capacitance touch detection, according to another embodiment.

FIG. 10 is a flow diagram illustrating touch detection using multimodal capacitance touch detection, according to another embodiment. Method 1000 may be performed by processing logic that comprises hardware (e.g., circuitry, dedicated logic, programmable logic, microcode), software (e.g., instructions run on a processing device to perform hardware simulation), or a combination thereof. In one embodiment, processing device 110 and/or touch detection module 120, as shown in FIG. 1 may perform some or all the operations described herein.

Method 1000 begins at block 1005 where processing logic performing the method determines if the characteristic of the noise signal indicates the presence of the noise signal. If the characteristic of the noise signal indicates the presence of the noise signal on the capacitive sense array, processing logic proceeds to block 1010. At block 1010, processing logic selects a first mode of capacitive touch detection (passive touch detection) from a plurality of modes of capacitive touch detection. At block 1015, processing logic detects the touch using the first mode of capacitive touch detection (passive touch detection). At block 1020, processing logic selects a second mode of capacitive touch detection (mutual capacitance touch detection) from a plurality of modes of capacitive touch detection. At block 1025, processing logic rejects signal measurements of the second mode of capacitive touch indicating the touch in view of signal measurements of the first mode of capacitance touch detection indicating a non-touch. At block 1030, processing logic detects the touch using the second mode of capacitive touch detection.

If the characteristic of the noise signal does not indicates the presence of the noise signal on the capacitive sense array, processing logic proceeds to block 1035. At block 1035, processing logic selects a second mode of capacitive touch detection (mutual capacitance touch detection) from a plurality of modes of capacitive touch detection. At block 1040, processing logic detects the touch using the second mode of capacitive touch detection. Additional details of method 1000 may be described in reference to FIGS. 1-5C, described above.

Water present on a sense array of a sensing system, such as a capacitive sense array of a capacitance sensing system, may cause errors in position detection. A capacitance sensing system may be unable to distinguish a touch proximate to the capacitive sense array from the presence of water on the capacitive sense array. Sensing a touch proximate a capacitive sense array may become particularly difficult if the capacitive sense array is submersed underwater.

The present disclosure addresses the above-mentioned and other deficiencies by sensing (e.g., detecting) a touch by a passive touch object proximate a capacitive sense array submersed underwater using a coupling of an external transmission signal to the capacitive sense array through a passive touch object and/or by sensing a touch by shunting the external transmission signal using the passive touch object to prevent the capacitive sense array submersed underwater from receiving the external transmission signal.

An external transmission signal (also referred to as an external TX signal) refers to a controlled electric signal, intended for the purpose of sensing a touch, coupled to an external transmission electrode located external to the capacitive sense array. The rows and columns of sense array may alternately be configured as transmission electrodes driven by a transmission signal. In contrast, an external transmission signal that may drive an external transmission electrode physically separate from the rows and columns of the capacitive sense array. An external transmission signal may be purposefully generated to drive one or more external transmission electrodes.

Submersed underwater refers to a majority of, substantially all of, or complete submersion of an object in water. For example, a capacitive sense array may be submersed underwater when the capacitive sense array is held under a running shower head (e.g., mobile phone taken into a shower) or when the capacitive sense array is under several feet of water (e.g., mobile phone is used in a pool).

In one embodiment, a capacitive sense array may be scanned to determine a characteristic of the presence of water. If the characteristic of the presence of water indicates that the capacitive sense array is submersed underwater, a touch by a passive touch object proximate to the capacitive sense array may be detected using a third mode of capacitive touch detection (also referred to as active finger touch detection) that uses a capacitive coupling of an external transmission signal to the capacitive sense array through the passive touch object. Additionally, if the characteristic of the presence of water indicates that the capacitive sense array is submersed underwater, a touch may be detected using a fourth mode of capacitive touch detection (also referred to as button muting touch detection) by shunting an external transmission signal using the passive touch object to prevent the capacitive sense array submersed underwater from receiving the external transmission signal. The external transmission signal may be shunted to a ground potential, such as common ground of an electronic device and/or earth ground.

Figure 11:
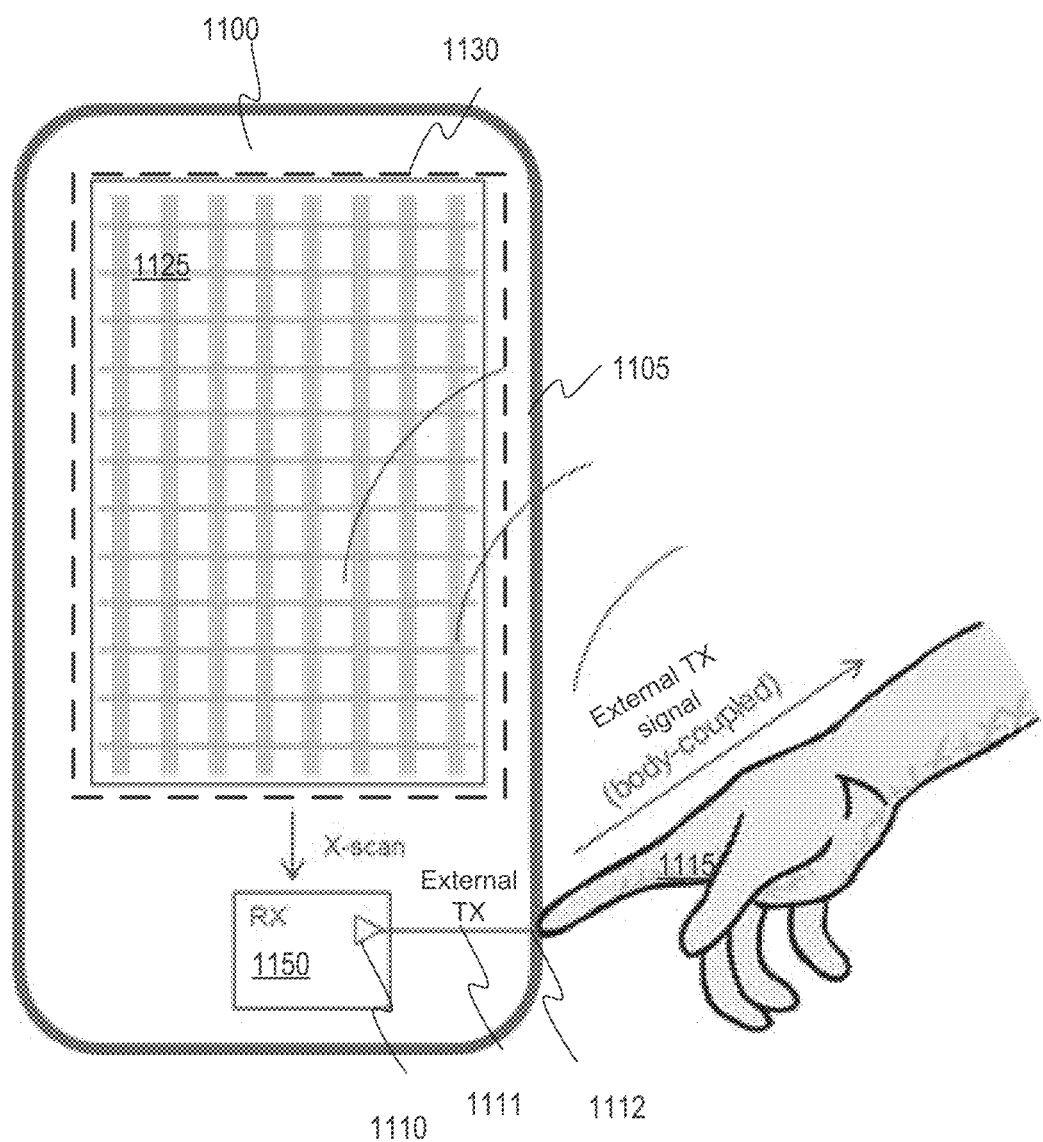
FIG. 11 illustrates a diagram of an electronic device including a capacitance sensing system to detect a touch if the capacitive sense array is submersed underwater, according to one embodiment.

FIG. 11 illustrates a diagram of an electronic device including a capacitance sensing system to detect a touch if the capacitive sense array is submersed underwater, according to one embodiment. Electronic device 1100 may be any type of electronic device such as a mobile phone, tablet, or other handheld device. Electronic device may include a capacitance sense array 1125. Capacitance sense array 1125 may be the same or similar to and/or perform the same or similar functions as capacitance sense array 125, described with respect to FIG. 1. Capacitance sense array 1125 illustrates row electrodes (horizontal rows) and column electrodes (vertical rows). Water 1130 illustrates capacitance sense array 1125 submersed underwater. Electronic device may include processing device 1150. Processing device 1150 may be the same or similar to and/or perform the same or similar functions as processing device 110, described with respect to FIG. 1. Processing device 1150 may include a touch detection module (not shown, e.g. touch detection module 120 of FIG. 1). Processing device 1150 (and/or touch detection module may) may perform all or some of the operations described below.

External transmission driver 1110 may drive external transmission signal 1111 to external transmission electrode 1112. As illustrated in FIG. 11, external transmission signal 1111 is external to the rows electrodes and column electrodes of capacitance sense array 1125. External transmission electrode 1112 may be configured to couple external transmission signal 1111 to passive touch object 1115 if passive touch object 1115 is proximate external transmission electrode 1112. Electronic device 1100 may include a housing 1105. Housing 1105 may be an external portion of an electronic device 1100. All or part of the housing 1105 may be conductive. Housing 1105, for example, may cover a substantial part of electronic device 1100 or may be a frame that surrounds the edges of electronic device 1100. If housing 1105 is conductive, external transmission signal 1111 may be coupled to the entire housing and the entire housing may be an external transmission electrode 1112. Alternatively, external transmission electrode 1112 may be any size. For purposes of illustration and not limitation, housing 1105 may be a conductive frame around electronic device 1100 to which external transmission signal 1111 is electrically coupled.

In one embodiment, processing device 1150 may scan capacitive sense array 1125 to determine a characteristic of a presence of water on capacitive sense array 1125. The characteristic of the presence of water may indicate that capacitive sense array 1125 is submersed underwater or is not submersed underwater. To determine a characteristic of a presence of water, processing device 1150 may perform a mutual capacitance touch detection scan as described above. For example, processing device 1150 may drive transmission signals using a first plurality of electrodes (e.g. row electrodes) that may be called transmission electrodes and designate another plurality of electrodes (e.g., the row electrodes) as receiving electrodes. If all or majority of the receiving electrodes indicate a touch (e.g., signal measurements exceed a touch threshold), processing device 1150 may determine that capacitive sense array 1125 is submersed underwater. If a minority or none of receiving electrodes indicate a touch, processing device 1150 may determine that capacitive sense array 1125 is not submersed underwater (and touch detection modes as described above may be executed). It should be noted if the capacitance sense array 1125 is dry and surrounded by air, a scan using mutual capacitance touch detection may indicate a non-touch. If presence of water is detected, processing device 1150 may detect a touch proximate to capacitive sense array 1125 submersed underwater by passive touch object 1115 using a third mode of capacitance touch detection (e.g., active finger touch detection) that uses a capacitive coupling of external transmission signal 1111 to capacitive sense array 1125 through passive touch object 1115. For example, external transmission electrode 1112 may or may not be submersed underwater. Capacitive sense array 1125 may be submersed underwater. Transmission signal of capacitive sense array 1125 may be turned off and one or more electrodes (e.g., row electrodes) may be set as receiving electrodes (as described above with respect to passive touch detection). External transmission signal 1111 may be coupled to conductive housing 1105. If a first part of passive touch object 1115 (e.g., right hand) grips or otherwise contacts housing 1105 external transmission signal 1111 may be coupled to the first part of passive touch object 1115. If a second part of passive touch object 1115 (e.g., left hand) is proximate capacitive sense array 1125, external transmission signal 1111 may be coupled through passive touch object 1115 (e.g., through right hand and the body) to the second part of passive touch object (e.g., left hand) and onto capacitive sense array 1125. The external transmission signal 1111 may be detected, signal measurements made, and one or more of the receiving electrodes may detect a touch in a manner similar to passive touch detection described above. It should be noted that, in an underwater condition, a touch, rather than touch coordinates (e.g. location of a touch), may be detected. The conductive nature of water may couple the external transmission signal 1111 received through the second part of passive touch object 1115 to multiple receiving electrodes outside of the touch location. It also should be noted, that external transmission signal 1111 in some cases may be coupled to capacitive sense array 1125 without the presence of passive touch object 1115. For example, electronic device 1100 may be submersed in high-conductive water which may couple external transmission signal 1111 to capacitive sense array 1125 without the presence of passive touch object 1115. In such a case, a touch using active finger touch detection may not distinguish a touch on capacitive sense array 1125 from the presence of water. Alternatively, button muting touch detection as described below with respect to FIG. 13 may be used to detect a touch under such conditions, as well as under other conditions.

Figure 12:
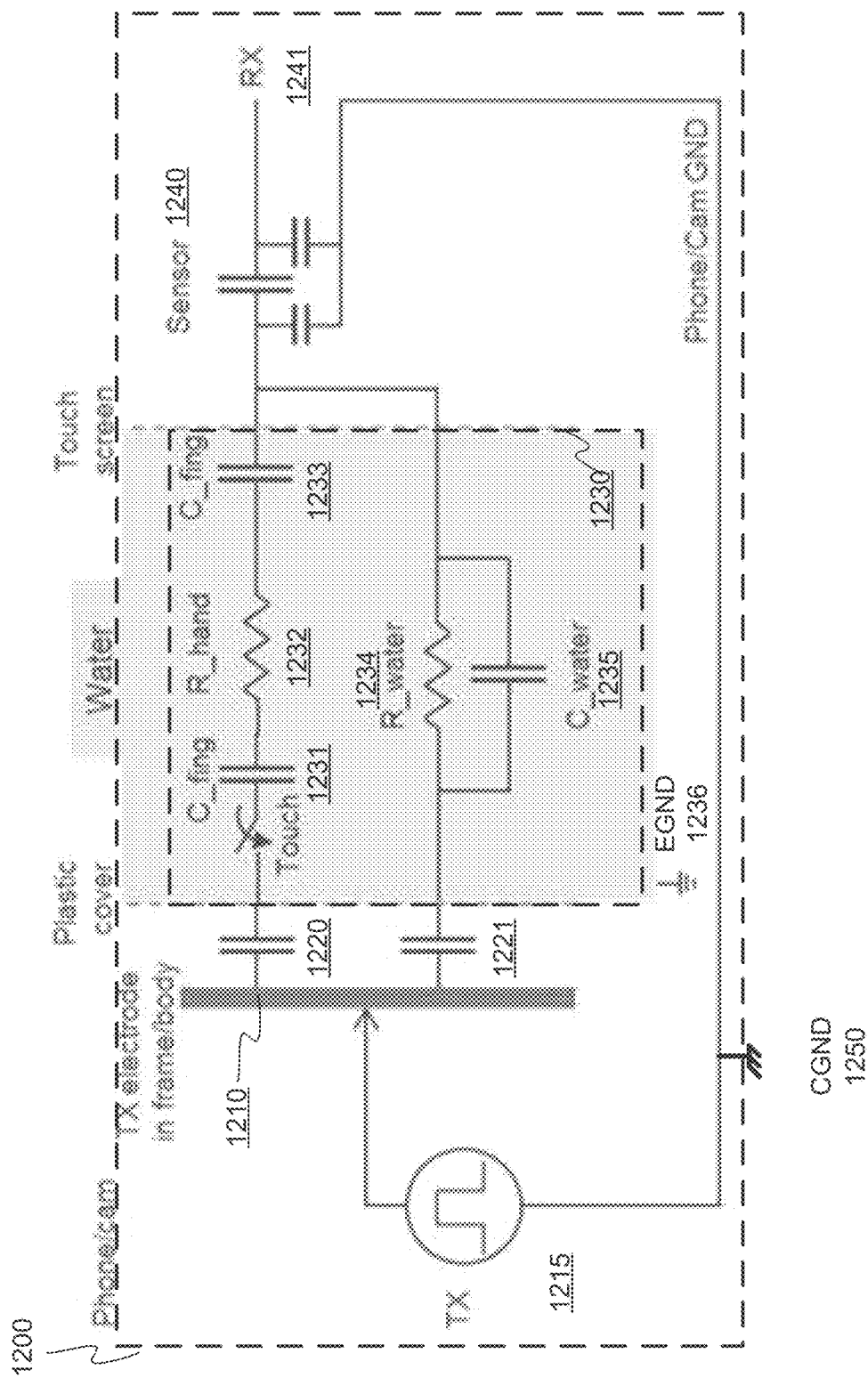
FIG. 12 illustrates a circuit diagram of a capacitive sense array of an electronic device submersed underwater, according to one embodiment.

FIG. 12 illustrates a circuit diagram of a capacitive sense array of an electronic device submersed underwater, according to one embodiment. Electronic device 1200 may be any type of electronic device, such as a mobile phone, tablet, camera, or other handheld device. Water 1230 illustrates a capacitive sense array submersed underwater. For purposes of illustration and not limitation, FIG. 12 may be used to describe electronic device 1100 described in FIG. 11. External transmission electrode 1210 is shown coupled to a conductive housing of electronic device 1200. External transmission signal 1215 is coupled to external transmission electrode 1210. An equivalent circuit of a passive touch object is illustrated by capacitor 1231, resistor 1232, and capacitor 1233. An equivalent circuit of water is illustrated by resistor 1234 and capacitor 1235. Water may be connected to earth ground 1236. The passive touch object may be coupled to external transmission electrode 1210 when the passive touch object is proximate the external transmission electrode 1210 (e.g., gripping the housing of the electronic device 1200). Coupling capacitor 1220 illustrates the capacitance between external transmission electrode 1210 and the passive touch object. If the housing of the device is also submersed in water, the water may couple with external transmission electrode 1210 through coupling capacitor 1221. The first part of a passive touch object (e.g., right hand touching external transmission electrode 1210) is illustrated by capacitor 1231 and a second part of a passive touch object is illustrated by capacitor 1233 (e.g., left hand touching the capacitive sense array). The resistance of the passive touch object is illustrated by resistor 1232. Capacitive sensor 1240 illustrates a circuit equivalent of a receive electrode of a capacitive sense array. Capacitive sensor 1240 may be coupled to a receive channel of a processing device (not shown). Capacitive sensor 1240 may be coupled to common ground 1250 of electronic device 1200.

Figure 13:
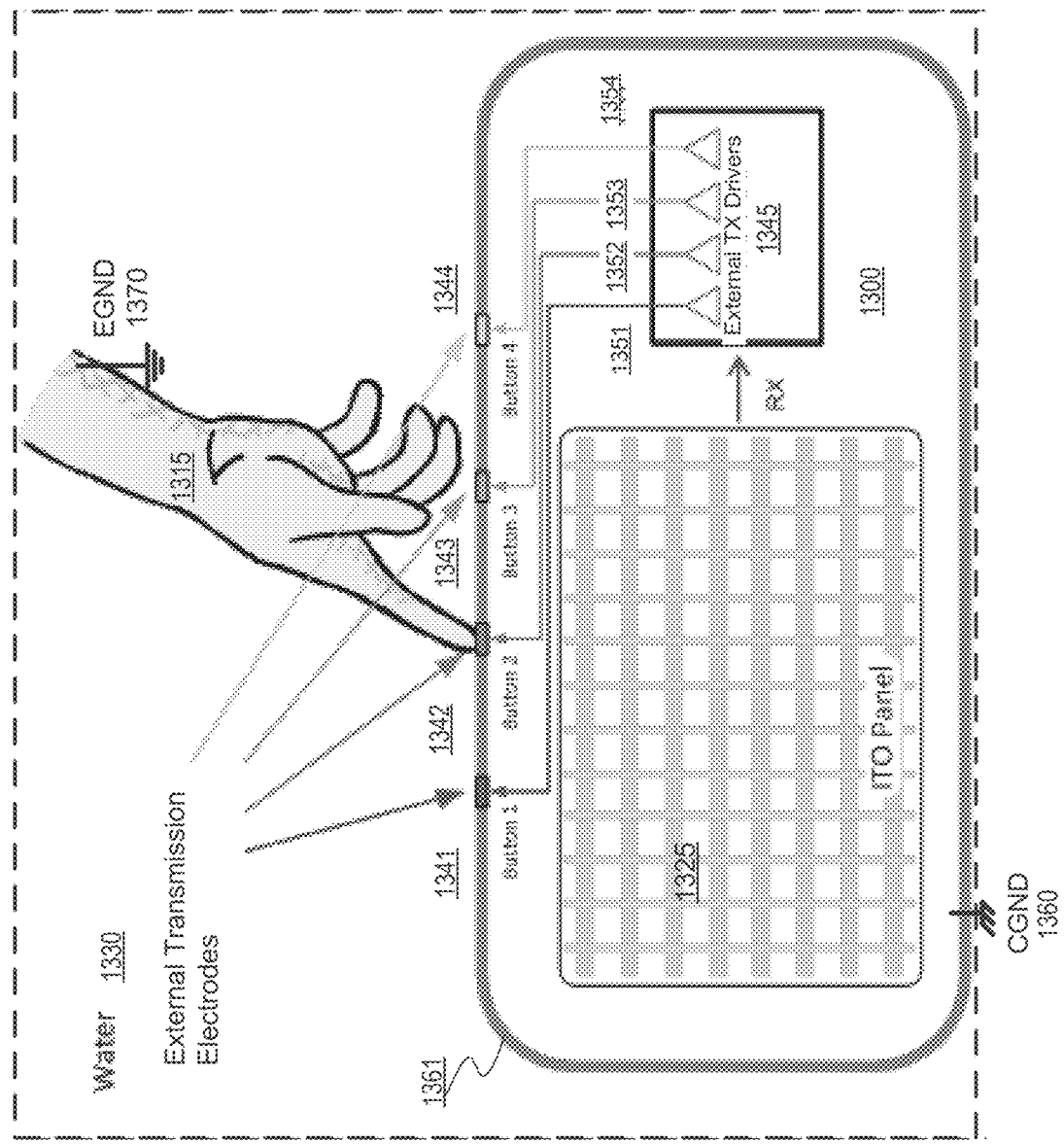
FIG. 13 illustrates a diagram of an electronic device including a capacitance sensing system to detect a touch if the capacitive sense array is submersed underwater, according to another embodiment.

FIG. 13 illustrates a diagram of an electronic device including a capacitance sensing system to detect a touch if the capacitive sense array is submersed underwater, according to another embodiment. Electronic device 1300 may be any electronic device such as a mobile phone, tablet, camera, or other portable electronic device. Electronic device 1300 includes capacitance sense array 1325. Capacitance sense array 1325 may be the same or similar to and/or perform the same or similar functions as capacitance sense array 125, described with respect to FIG. 1. Electronic device 1300 may include processing device 1345 which may perform the same or similar functions as processing device 110, as described with respect to FIG. 1. Processing device 1345 may include a touch detection module (not shown).

Processing device 1345 includes external transmission drivers to drive external transmission signals 1351-1354 to external transmission electrodes 1341-1344 (also referred to as buttons), respectively. Although four external transmission electrodes are illustrated, any number of external transmission electrodes may be used. Each external transmission signal 1351-1354 may be driven in different windows of time (e.g., non-overlapping). Alternatively, each external transmission signal 1351-1354 may be driven at different frequencies during the same window of time (e.g., overlapping) or different windows of time. In another alternative, all external transmission signals 1351-1354 may be driven in the same window of time at the same (or similar) frequency using different digital encoding schemes (e.g., similar to code division multiple access (CDMA) techniques). External transmission electrodes 1341-1344 may be electrically isolated from housing 1361. Housing 1361 may be conductive and connected to common ground 1360 of electronic device 1300. In another example, housing 1361 may not be conductive and may be unconnected to common ground 1360 of electronic device 1300. It should be noted that both capacitive sense array 1325 and external transmission electrodes 1341-1344 may be submersed underwater so that external transmission signals 1351 may be conducted through water to receiving electrodes of capacitive sense array 1325. Water 1330 illustrates electronic device 1300 submersed underwater.

In one embodiment, processing device 1345 may scan capacitive sense array 1325 to determine a characteristic of a presence of water. Processing device may determine that capacitance sense array 1325 is submersed underwater or not submersed underwater in a similar manner as described with respect to FIG. 11.

In another embodiment, processing device may determine if both the capacitive sense array 1325 and external transmission electrodes 1341-1344 (e.g., determine if electronic device 1300 is submersed underwater) are submersed underwater by turning off transmission electrodes of capacitive sense array 1325 and configuring one or more of a plurality of electrodes (e.g., row electrodes) as receiving electrodes. Further, processing device 1345 may drive one or more external transmission electrodes 1341-1344 with external transmission signal 1351-1354, respectively. If the driven external transmission signal is received by the receiving electrodes of capacitive sense array 1325, processing device 1345 may determine that electronic device 1300 is submersed underwater (because the external transmission signal is conducted through low-impedance path provided by conductive water 1330 from the external transmission electrode to capacitive sense array 1325). If the driven external transmission signal not received by the receiving electrodes, processing device 1345 may determine that electronic device 1300 is not submersed underwater.

In one embodiment, if processing device 1345 determines that electronic device is submersed underwater, a touch proximate an external transmission electrode 1341-1344 (e.g., button) by a passive touch object 1315 may be detected using a fourth mode of capacitive touch detection (e.g., button muting touch detection). Button muting touch detection may use passive touch object 1315 to shunt the external transmission signal 1351-1354 to a ground potential, such as conductive housing 1361 coupled to common ground 1360 and/or earth ground 1370 (of water 1330). For example, transmission signals of capacitive sense array 1325 may be turned off and one or more electrodes (e.g., row electrodes) may be configured as receiving electrodes, in a similar manner as described in regards to passive touch detection. External transmission drivers may drive external transmission signals 1351-1354. The external transmission signals 1351-1354 may be driven at different windows of time and/or at different frequencies or at the same window of time using a digital encoding scheme enabling processing device 1345 to differentiate the received signals at receiving electrodes and determine from which external transmission electrode 1341-1344 the received signal originated. When passive touch object 1315 contacts or substantially covers an external transmission electrode, such as external transmission electrode 1342, passive touch object may shunt the corresponding external transmission signal 1352 to a ground potential, such as conductive housing 1361 coupled to common ground 1350 of electronic device 1300, or to earth ground 1370. If passive touch object 1315 shunts external transmission signal 1352, the external transmission signal 1352 is not received by the receiving electrodes of capacitive sense array 1325. Processing device 1345 may detect the absence of signal measurements indicating the reception of external transmission signal 1352 on capacitive sense array 1325. Processing device 1345 may detect from the absence of signal measurements a touch proximate external transmission electrode 1342 by passive touch object 1315. Accordingly, processing device 1345 may detect a touch on different external transmission electrodes at the same and/or different windows of time.

Figure 14:
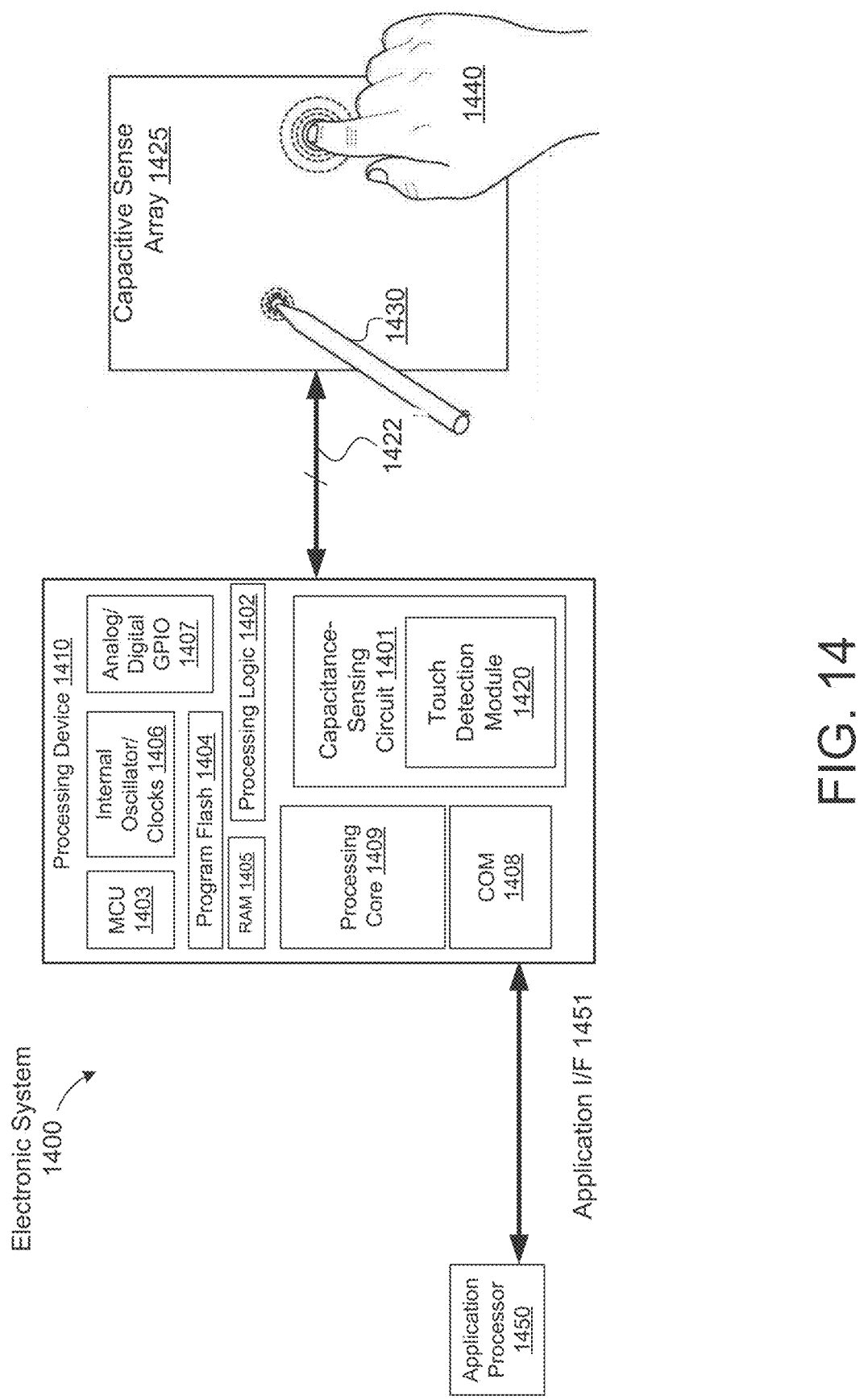
FIG. 14 is a block diagram illustrating an electronic system including a processing device and passive touch detection module, according to another embodiment.

FIG. 14 is a block diagram illustrating an electronic system including a processing device and passive touch detection module, according to another embodiment. Processing device 1410 may perform the same or similar functions as described with respect to processing device 110 of FIG. 1, and vice versa. Touch detection module 1420 may perform the same or similar functions as described with respect to touch detection module 120 of FIG. 1, and vice versa. Capacitive sense array 1425 may perform the same or similar functions or include the same or similar features as described with respect to capacitive sense array 125 of FIG. 1, and vice versa. The processing device 1410 is configured to detect one or more touches detected proximate to a touch-sensing device, such as capacitive sense array 1425. The processing device 1410 may detect conductive objects, such as passive touch object 1440 (e.g., fingers and/or passive stylus 1430, or any combination thereof). The capacitance-sensing circuit 1401 may measure touch data created by a touch using the capacitive sense array 1425. The touch may be detected by a single or multiple sensing cells, each cell representing an isolated sense element or an intersection of sense elements (e.g., electrodes) of the capacitive sense array 1425. In one embodiment, when the capacitance-sensing circuit 1401 measures mutual capacitance of the touch-sensing device (e.g., using capacitive sense array 1425), the capacitance-sensing circuit 1401 acquires a 2D capacitive image of the touch-sensing object and processes the data for peaks and positional information. In another embodiment, the processing device 1410 is a microcontroller that obtains a capacitance touch signal data set from application processor 1450, such as from capacitive sense array 1425, and finger detection firmware executing on the microcontroller identifies data set areas that indicate touches, detects and processes peaks, calculates the coordinates, or any combination therefore. The microcontroller may report the precise coordinates to an application processor, as well as other information.

Electronic system 1400 includes processing device 1410, capacitive sense array 1425, passive stylus 1430, and application processor 1450. The capacitive sense array 1425 may include capacitive sense elements that are electrodes of conductive material, such as copper. The sense elements may also be part of an indium-tin-oxide (ITO) panel. The capacitive sense elements may be used to allow the capacitance-sensing circuit 1401 to measure self-capacitance, mutual capacitance, passive touch detection, other modes of touch detection, or any combination thereof. In the depicted embodiment, the electronic system 1400 includes the capacitive sense array 1425 coupled to the processing device 1410 via bus 1422. The capacitive sense array 1425 may include a multi-dimension capacitive sense array. The multi-dimension sense array includes multiple sense elements, organized as rows and columns. In another embodiment, the capacitive sense array 1425 is non-transparent capacitive sense array (e.g., PC touchpad). The capacitive sense array 1425 may be disposed to have a flat surface profile. Alternatively, the capacitive sense array 1425 may have non-flat surface profiles. Alternatively, other configurations of capacitive sense arrays may be used. For example, instead of vertical columns and horizontal rows, the capacitive sense array 1425 may have a hexagon arrangement, or the like, as would be appreciated by one of ordinary skill in the art having the benefit of this disclosure. In one embodiment, the capacitive sense array 1425 may be included in an ITO panel or a touch screen panel.

The operations and configurations of the processing device 1410 and the capacitive sense array 1425 for detecting and tracking the passive touch object 1440 are described herein. In short, the processing device 1410 is configurable to detect a presence of the passive touch object 1440 on the capacitive sense array 1425.

In the depicted embodiment, the processing device 1410 includes analog and/or digital general purpose input/output ("GPIO") ports 1407. GPIO ports 1407 may be programmable. GPIO ports 1407 may be coupled to a Programmable Interconnect and Logic ("PIL"), which acts as an interconnect between GPIO ports 1407 and a digital block array of the processing device 1410 (not shown). The digital block array may be configurable to implement a variety of digital logic circuits (e.g., DACs, digital filters, or digital control systems) using, in one embodiment, configurable user modules ("UMs"). The digital block array may be coupled to a system bus. Processing device 1410 may also include a memory device, such as random access memory ("RAM") 1405 and program flash 1404. RAM 1405 may be static RAM ("SRAM"), and program flash 1404 may be a nonvolatile storage, which may be used to store firmware (e.g., control algorithms executable by processing core 1409 to implement operations described herein). Processing device 1410 may also include a memory controller unit ("MCU") 1403 coupled to memory and the processing core 1409. The processing core 1409 is a processing element configured to execute instructions or perform operations. The processing device 1410 may include other processing elements as would be appreciated by one of ordinary skill in the art having the benefit of this disclosure. It should also be noted that the memory may be internal to the processing device or external to it. In the case of the memory being internal, the memory may be coupled to a processing element, such as the processing core 1409. In the case of the memory being external to the processing device, the processing device is coupled to the other device in which the memory resides as would be appreciated by one of ordinary skill in the art having the benefit of this disclosure.

In one embodiment, the processing device 1410 further includes processing logic 1402. Some or all of the operations of the processing logic 1402 may be implemented in firmware, hardware, or software or some combination thereof. The processing logic 1402 may receive signals from the capacitance-sensing circuit 1401, and determine the state of the capacitive sense array 1425, such as whether an passive touch object 1440 (e.g., a finger) is detected on or in proximity to the capacitive sense array 1425 (e.g., determining the presence of the object), resolve where the passive touch object 1440 is on the sense array (e.g., determining the location of the passive touch object 1440), tracking the motion of the passive touch object 1440, or other information related to an passive touch object 1440 detected at the touch sensor. In another embodiment, processing logic 1402 may include capacitance-sensing circuit 1401. In another embodiment, processing logic 1402 may perform some or all the functions of capacitance-sensing circuit 1401 and/or processing device 1410.

The processing device 1410 may also include an analog block array (not shown) (e.g., field-programmable analog array). The analog block array is also coupled to the system bus. Analog block array may also be configurable to implement a variety of analog circuits (e.g., ADCs or analog filters) using, in one embodiment, configurable UMs. The analog block array may also be coupled to the GPIO 1407.

As illustrated, capacitance-sensing circuit 1401 may be integrated into processing device 1410. Capacitance-sensing circuit 1401 may include analog I/O for coupling to an external component, such as touch-sensor pad (not shown), capacitive sense array 1425, touch-sensor slider (not shown), touch-sensor buttons (not shown), and/or other devices. The capacitance-sensing circuit 1401 may be configurable to measure capacitance using mutual-capacitance touch detection techniques, self-capacitance touch detection techniques, passive touch detection techniques, charge-coupling techniques, charge balancing techniques, or the like. In one embodiment, capacitance-sensing circuit 1401 operates using a charge accumulation circuit, a capacitance modulation circuit, or other capacitance sensing methods known by those skilled in the art. In an embodiment, the capacitance-sensing circuit 1401 is of the Cypress TMA-3xx, TMA-4xx, or TMA-xx families of touch screen controllers. Alternatively, other capacitance-sensing circuits may be used. The mutual capacitive sense arrays, or touch screens, as described herein, may include a transparent, conductive sense array disposed on, in, or under either a visual display itself (e.g. LCD monitor), or a transparent substrate in front of the display. In an embodiment, the transmission (TX) and receiving (RX) electrodes are configured in rows and columns, respectively. It should be noted that the rows and columns of electrodes may be configured as TX or RX electrodes by the capacitance-sensing circuit 1401 in any chosen combination. In one embodiment, the TX and RX electrodes of the sense array 1425 are configurable to operate as a TX and RX electrodes of a mutual capacitive sense array in a first mode to detect passive touch objects, and to operate as electrodes of a coupled-charge receiver in a second mode to detect a stylus on the same electrodes of the sense array. An intersection between two sense elements may be understood as a location at which one sense electrode crosses over or overlaps another, while maintaining galvanic isolation from each other. The capacitance associated with the intersection between a TX electrode and an RX electrode may be sensed by selecting every available combination of TX electrode and RX electrode. When a passive touch object 1440 approaches the capacitive sense array 1425, the object causes a decrease in mutual capacitance between some of the TX/RX electrodes. In another embodiment, the presence of a finger increases the capacitance of the electrodes to the environment (Earth) ground, typically referred to as self-capacitance change. Utilizing the change in mutual capacitance, the location of the finger on the capacitive sense array 1425 may be determined by identifying the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more touch objects may be determined. It should be noted that the process may calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of coordinate interpolation algorithms may be used to detect the center of the touch as would be appreciated by one of ordinary skill in the art having the benefit of this disclosure.

Processing device 1410 may include internal oscillator/clocks 1406 and communication block ("COM") 1408. In another embodiment, the processing device 1410 includes a spread-spectrum clock (not shown). The oscillator/clocks block 1406 provides clock signals to one or more of the components of processing device 1410. Communication block 1408 may be used to communicate with an external component, such as an application processor 1450, via application interface ("I/F") line 1451.

Processing device 1410 may reside on a common carrier substrate such as, for example, an integrated circuit ("IC") die substrate, a multi-chip module substrate, or the like. Alternatively, the components of processing device 1410 may be one or more separate integrated circuits and/or discrete components. In one exemplary embodiment, processing device 1410 is the Programmable System on a Chip (PSoC®) processing device, developed by Cypress Semiconductor Corporation, San Jose, Calif. Alternatively, processing device 1410 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to an application processor, but may include a system that measures the capacitance on the sensing device and sends the raw data to a host computer where it is analyzed by an application. In effect, the processing that is done by processing device 1410 may also be done in the application processor.

Capacitance-sensing circuit 1401 may be integrated into the IC of the processing device 1410, or alternatively, in a separate IC. Alternatively, descriptions of capacitance-sensing circuit 1401 may be generated and compiled for incorporation into other integrated circuits. For example, behavioral level code describing the capacitance-sensing circuit 1401, or portions thereof, may be generated using a hardware descriptive language, such as VHDL or Verilog, and stored to a machine-accessible medium (e.g., CD-ROM, hard disk, floppy disk, etc.). Furthermore, the behavioral level code may be compiled into register transfer level ("RTL") code, a netlist, or even a circuit layout and stored to a machine-accessible medium. The behavioral level code, the RTL code, the netlist, and the circuit layout may represent various levels of abstraction to describe capacitance-sensing circuit 1401.

It should be noted that the components of electronic system 1400 may include all the components described above. Alternatively, electronic system 1400 may include some of the components described above.

In one embodiment, the electronic system 1400 is used in a tablet computer. Alternatively, the electronic device may be used in other applications, such as a notebook computer, a mobile handset, a personal data assistant ("PDA"), a keyboard, a television, a remote control, a monitor, a hand-held multi-media device, a handheld media (audio and/or video) player, a handheld gaming device, a signature input device for point of sale transactions, an eBook reader, global position system ("GPS") or a control panel. The embodiments described herein are not limited to touch screens or touch-sensor pads for notebook implementations, but may be used in other capacitive sensing implementations, for example, the sensing device may be a touch-sensor slider (not shown) or touch-sensor buttons (e.g., capacitance sensing buttons). In one embodiment, these sensing devices include one or more capacitive sensors or other types of capacitance-sensing circuitry. The operations described herein are not limited to notebook pointer operations, but may include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 15:
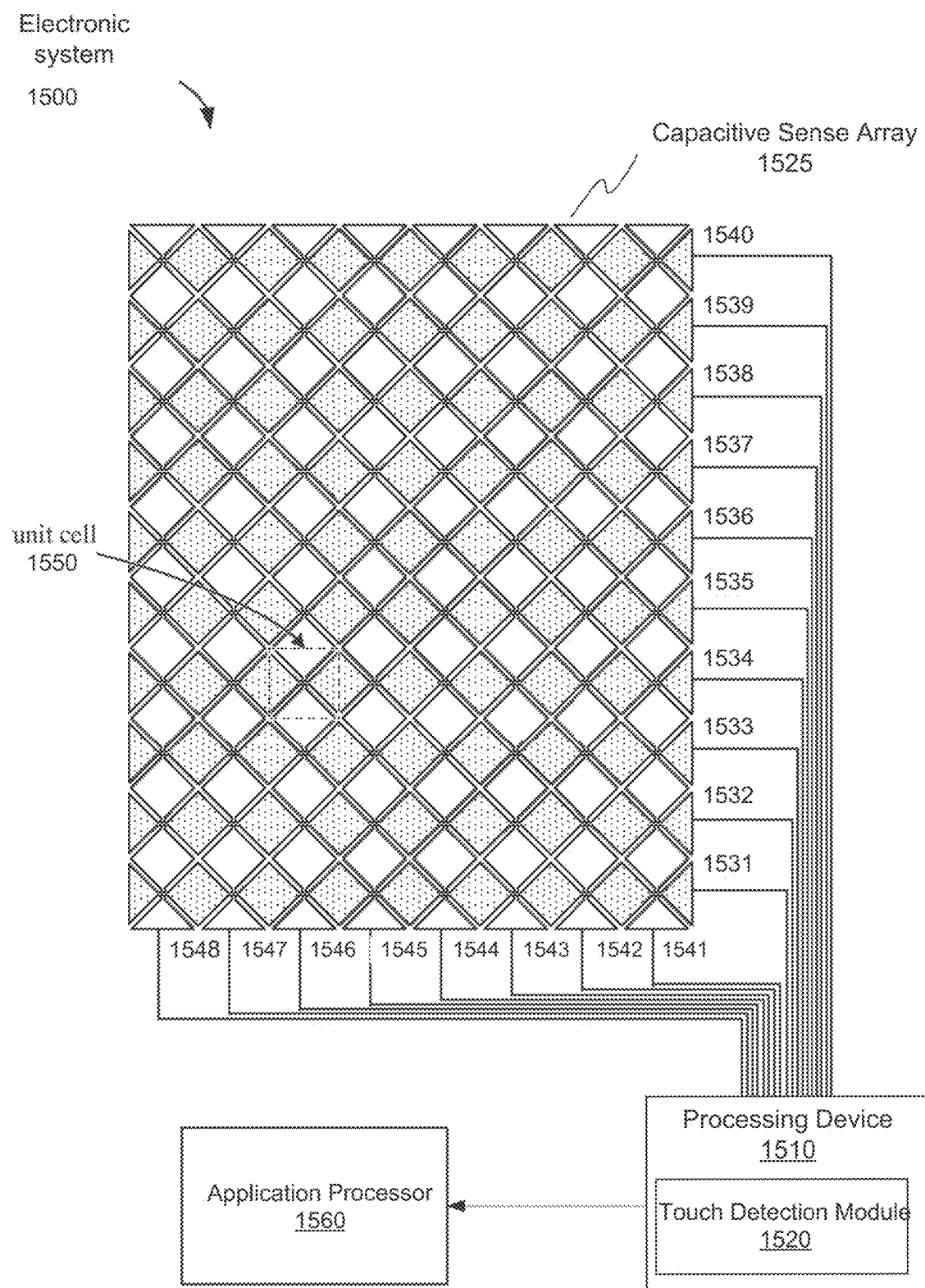
FIG. 15 is a diagram illustrating an electronic system including a processing device and passive touch detection module, according to another embodiment.

FIG. 15 is a diagram illustrating an electronic system including a processing device and passive touch detection module, according to another embodiment. Processing device 1510 may perform the same or similar functions as described with respect to processing device 110 of FIG. 1, and vice versa. Touch detection module 1520 may perform the same or similar functions as described with respect to touch detection module 120 of FIG. 1, and vice versa. Capacitive sense array 1525 may perform the same or similar functions or include the same or similar features as described with respect to capacitive sense array 125 of FIG. 1, and vice versa. Electronic system 1500 includes a capacitive sense array 1525. Capacitive sense array 1525 includes multiple row electrodes 1531-1540 and multiple column electrodes 1541-1548. The row and column electrodes 1531-1548 are connected to a processing device 1510 and touch detection module 1520. In one embodiment, the processing device 1510 may perform mutual capacitance measurement scans of the capacitive sense array 1525 to measure a mutual capacitance value associated with each of the intersections between a row electrode and a column electrode in the capacitive sense array 1525. The measured capacitances may be further processed to determine centroid locations of one or more contacts of conductive objects proximate to the capacitive sense array 1525. In another embodiment, processing device 1510 may perform passive touch detection, multimodal touch detection, and/or touch detection when capacitive sense array is submersed underwater.

In one embodiment, the processing device 1510 is connected to an application processor 1560 which may receive the measured capacitances or calculated centroid locations from the processing device 1510.

The capacitive sense array 1525 includes electrodes arranged to create a pattern of interconnected diamond shapes. Specifically, the row and column electrodes 1531-1548 of capacitive sense array 1525 form a single solid diamond (SSD) pattern. In one embodiment, each intersection between a row electrode and a column electrode defines a unit cell. Each point within the unit cell is closer to the associated intersection than to any other intersection. For example, unit cell 1550 contains the points that are closest to the intersection between row electrode 1534 and column electrode 1546.

In one embodiment, electronic system 1500 may collect data from the entire touch-sensing surface of capacitive sense array 1525 by performing a scan to measure capacitances of the unit cells that comprise the touch-sensing surface, then process the touch data serially or in parallel with a subsequent scan. For example, one system that processes touch data serially may collect raw capacitance data from each unit cell of the entire touch-sensing surface, and filter the raw data. Based on the filtered raw data, the system may determine local maxima (corresponding to local maximum changes in capacitance) to calculate positions of fingers or other conductive objects, then perform post processing of the resolved positions to report locations of the conductive objects, or to perform other functions such as motion tracking or gesture recognition.

In one embodiment, electronic system 1500 may be configured to perform both of self-capacitance sensing and mutual capacitance touch detection, or any other type of touch detection. In one embodiment, electronic system 1500 is configured to perform self-capacitance sensing, in sequence or in parallel, to measure the self-capacitance of each row and column electrode of the touch-sensing surface (e.g., capacitive sense array 1525), such that the total number of sense operations is N+M, for a capacitive-sense array having N rows and M columns. In one embodiment, processing device 1510 may be capable of connecting individual electrodes together to be sensed in parallel with a single operation. For example, multiple row (e.g., row electrodes 1531-1540) and or column electrodes (e.g., column electrodes 1541-1548) may be coupled together and sensed in a single operation to determine whether a conductive object is touching or near the touch-sensing surface. In an alternate embodiment, the electronic system 1500 may be capable of connecting each row electrode to it is own sensing circuit such that all row electrodes may be sensed in parallel with a single operation. The electronic system 1500 may also be capable of connecting each column electrode to its own sensing circuit such that all column electrodes may be sensed in parallel with a single operation. The electronic system 1500 may also be capable of connecting all row and column electrodes to their own sensing circuits, such that all row and column electrodes may be sensed in parallel with a single operation.

In one embodiment, the electronic system 1500 may perform mutual capacitance touch detection of the touch-sensing surface (e.g., capacitive sense array 1525) by individually sensing each intersection between a row electrode and a column electrode. Thus, a total number of sense operations for a capacitive-sense array (e.g., capacitive sense array 1525) having X rows and Y columns is X×Y. In one embodiment, performing a mutual capacitance measurement of a unit cell formed at the intersection of a row electrode and a column electrode includes applying a signal (TX) to one electrode and measuring characteristics of the signal on another electrode resulting from the capacitive coupling between the electrodes.

In one embodiment, multiple capacitance-sensing circuits may be used in parallel to measure a signal coupled to multiple column electrodes simultaneously, from a signal applied to one or more row electrodes. In one embodiment, for a capacitive-sense array (e.g., capacitive sense array 1525) having X rows, Y columns, and N columns that may be sensed simultaneously, the number of mutual capacitance touch detection operations is the smallest whole number greater than or equal to X×Y/N.

In one embodiment, each update of the touch locations may include a sensing portion and a non-sensing portion. The sensing portion may include measurement of capacitance associated with intersections between electrodes, while the non-sensing portion may include calculation of touch locations based on the capacitance measurements and reporting of the calculated touch locations to a host device.

In one exemplary embodiment, processing device 1510 may be a Programmable System on a Chip (PSoC®) processing device, developed by Cypress Semiconductor Corporation, San Jose, Calif. Alternatively, processing device 1510 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device may be a network processor having multiple processors including a core unit and multiple microengines. Additionally, the processing device may include any combination of general-purpose processing device(s) and special-purpose processing device(s). Embodiments of the present invention include various operations described herein. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner. The terms "first," "second," "third," "fourth," etc. as used herein are meant as labels to distinguish among different elements and may not necessarily have an ordinal meaning according to their numerical designation.

The above description sets forth numerous specific details such as examples of specific systems, components, methods, and so forth, in order to provide an understanding of several embodiments of the present invention. It may be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the scope of the present invention.

What is claimed is:

1. A method comprising:
    scanning a capacitive sense array to determine a characteristic of a noise signal; and
    detecting, by a processing device, a location of a touch proximate to the capacitive sense array by a passive touch object using a first mode of capacitance touch detection that uses a capacitive coupling of the noise signal to the capacitive sense array through the passive touch object to detect the touch;
    wherein detecting the touch proximate to the capacitive sense array by the passive touch object using the first mode of capacitance touch detection further comprises:
        comparing a first plurality of signal measurements to a touch threshold, the first plurality of signal measurements being indicative of the capacitive coupling of the noise signal to a first plurality of electrodes through the passive touch object; and
        determining, for signal measurements of the first plurality of signal measurements of mixed polarity that exceed the touch threshold, if a majority of the signal measurements have a same polarity.

2. The method of claim 1, further comprising:
    selecting the first mode of capacitance touch detection from a plurality of modes of capacitance touch detection if the characteristic of the noise signal indicates a presence of the noise signal;
    selecting a second mode of capacitance touch detection from the plurality of modes of capacitance touch detection if the characteristic of the noise signal indicates an absence of the noise signal; and
    detecting, by the processing device in view of the characteristic of the noise signal, a touch proximate to the capacitive sense array by a passive touch object using the first mode of capacitance touch detection or the second mode of capacitance touch detection.

3. The method of claim 2, wherein detecting the touch proximate to the capacitive sense array by a passive touch object using the second mode of capacitance scanning, during a third operation, a first plurality of electrodes along a first axis of the capacitive sense array to determine a third plurality of signal measurements corresponding to a mutual capacitance at electrode intersections of the capacitive sense array;
    scanning, during a fourth operation, a second plurality of electrodes along a second axis of the capacitive sense array to determine a fourth plurality of signal measurements corresponding to the mutual capacitance at electrode intersections of the capacitive sense array, wherein the third operation and the fourth operation occur at a different window of time;
    identifying a touch position equation from a plurality of touch position equations for use in determining a third coordinate and a fourth coordinate of the touch by the passive touch object proximate to the capacitive sense array; and
    determining the third coordinate in view of the third plurality of signal measurements and the fourth coordinate in view of the fourth plurality of signal measurements.

4. The method of claim 1, further comprising:
    selecting the first mode and a second mode of capacitance touch detection from a plurality of modes of capacitance touch detection if the characteristic of the noise signal indicates a presence of the noise signal;
    rejecting signal measurements of the second mode of capacitance touch detection indicating the touch, in view of signal measurements of the first mode of capacitance touch detection indicating a non-touch; and
    detecting the touch proximate to the capacitive sense array by the passive touch object using the second mode of capacitance touch detection.

5. The method of claim 1, wherein the passive touch object is a part of a human body.

6. The method of claim 1, wherein detecting the touch proximate to the capacitive sense array by the passive touch object using the first mode of capacitance touch detection, further comprises:
    scanning, during a first operation, a first plurality of electrodes along a first axis of the capacitive sense array to determine a first plurality of signal measurements indicative of the capacitive coupling of the noise signal to the first plurality of electrodes through the passive touch object; and
    determining a first coordinate of the touch by the passive touch object proximate to the capacitive sense array in view of the first plurality of signal measurements.

7. The method of claim 6, wherein scanning the first plurality of electrodes comprises:
    configuring a second plurality of electrodes along a second axis to a ground potential; and determining, at the first plurality of electrodes along the first axis, the first plurality of signal measurements corresponding to the capacitive coupling of the noise signal to the first plurality of electrodes through the passive touch object.

8. The method of claim 6, wherein detecting the touch proximate to the capacitive sense array by the passive touch object using the first mode of capacitance touch detection, further comprises:
    scanning, during a second operation, a second plurality of electrodes along a second axis of the capacitive sense array to determine a second plurality of signal measurements indicative of the capacitive coupling of the noise signal to the second plurality of electrodes through the passive touch object;
    comparing the second plurality of signal measurements to a touch threshold;
    determining, for signal measurements of the second plurality of signal measurements exceeding the touch threshold, if the signal measurements are a same polarity; and
    determining a second coordinate of the touch by the passive touch object proximate to the capacitive sense array in view of the second plurality of signal measurements.

9. The method of claim 8, wherein scanning the second plurality of electrodes comprises:
- configuring the first plurality of electrodes along the first axis to a ground potential; and
- determining, at the second plurality of electrodes along the second axis, the second plurality of signal measurements corresponding to the capacitive coupling of the noise signal to the second plurality of electrodes through the passive touch object.

10. An apparatus comprising:
a processing device configured to:
- scan a capacitive sense array to determine a characteristic of a noise signal; and
- detect a location of a touch proximate to the capacitive sense array by a passive touch object using a first mode of capacitance touch detection that uses a capacitive coupling of the noise signal to the capacitive sense array through the passive touch object to detect the touch;
- wherein to detect the touch proximate to the capacitive sense array by the passive touch object using the first mode of capacitance touch detection, the processing device is further configured to:
  - compare a first plurality of signal measurements to a touch threshold, the first plurality of signal measurements being indicative of the capacitive coupling of the noise signal to a first plurality of electrodes through the passive touch object; and
  - determine, for signal measurements of the first plurality of signal measurements of mixed polarity that exceed the touch threshold, if a majority of the signal measurements have a same polarity.

11. The apparatus of claim 10, the processing device further configured to:
- select the first mode of capacitance touch detection from a plurality of modes of capacitance touch detection if the characteristic of the noise signal indicates a presence of the noise signal;
- select a second mode of capacitance touch detection from the plurality of modes of capacitance touch detection if the characteristic of the noise signal indicates an absence of the noise signal; and
- detect, in view of the characteristic of the noise signal, a touch proximate to the capacitive sense array by a passive touch object using the first mode of capacitance touch detection or the second mode of capacitance touch detection.

12. The apparatus of claim 10, the processing device further configured to:
- select the first mode and a second mode of capacitance touch detection from a plurality of modes of capacitance touch detection if the characteristic of the noise signal indicates a presence of the noise signal;
- reject signal measurements of the second mode of capacitance touch detection indicating the touch, in view of signal measurements of the first mode of capacitance touch detection indicating a non-touch; and
- detect the touch proximate to the capacitive sense array by the passive touch object using the second mode of capacitance touch detection.

13. The apparatus of claim 10, wherein to detect the touch proximate to the capacitive sense array by the passive touch object using the first mode of capacitance touch detection, the processing device further configured to:
- scan, during a first operation, a first plurality of electrodes along a first axis of the capacitive sense array to determine a first plurality of signal measurements indicative of the capacitive coupling of the noise signal to the first plurality of electrodes through the passive touch object; and
- determine a first coordinate of the touch by the passive touch object proximate to the capacitive sense array in view of the first plurality of signal measurements.

14. The apparatus of claim 13, wherein to scan the first plurality of electrodes, the processing device further configured to:
- configure a second plurality of electrodes along a second axis to a ground potential; and
- determine, at the first plurality of electrodes along the first axis, the first plurality of signal measurements corresponding to the capacitive coupling of the noise signal to the first plurality of electrodes through the passive touch object.

15. A system comprising:
a capacitive sense array;
a memory device; and
a processing device coupled to the memory device and the capacitive sense array, the processing device configured to:
- scan a capacitive sense array to determine a characteristic of a noise signal; and
- detect a touch proximate to the capacitive sense array by a passive touch object using a first mode of capacitance touch detection that uses a capacitive coupling of the noise signal to the capacitive sense array through the passive touch object to detect the touch,
- wherein to detect the touch proximate to the capacitive sense array by the passive touch object using the first mode of capacitance touch detection, the processing device is further configured to:
  - compare a first plurality of signal measurements to a touch threshold, the first plurality of signal measurements being indicative of the capacitive coupling of the noise signal to a first plurality of electrodes through the passive touch object; and
  - determine, for signal measurements of the first plurality of signal measurements of mixed polarity that exceed the touch threshold, if a majority of the signal measurements have a same polarity.

16. The system of claim 15, the processing device further configured to:
- select the first mode of capacitance touch detection from a plurality of modes of capacitance touch detection if the characteristic of the noise signal indicates a presence of the noise signal; select a second mode of capacitance touch detection from the plurality of modes of capacitance touch detection if the characteristic of the noise signal indicates an absence of the noise signal; and
- detect, in view of the characteristic of the noise signal, a touch proximate to the capacitive sense array by a passive touch object using the first mode of capacitance touch detection or the second mode of capacitance touch detection.

17. The system of claim 15, the processing device further configured to:
- select the first mode and a second mode of capacitance touch detection from a plurality of modes of capacitance touch detection if the characteristic of the noise signal indicates a presence of the noise signal;
- reject signal measurements of the second mode of capacitance touch detection indicating the touch, in view of signal measurements of the first mode of capacitance touch detection indicating a non-touch; and detect the touch proximate to the capacitive sense array by the passive touch object using the second mode of capacitance touch detection.

18. The system of claim 15, wherein to detect the touch proximate to the capacitive sense array by the passive touch object using the first mode of capacitance touch detection, the processing device further configured to:
  scan, during a first operation, a first plurality of electrodes along a first axis of the capacitive sense array to determine a first plurality of signal measurements indicative of the capacitive coupling of the noise signal to the first plurality of electrodes through the passive touch object; and
  determine a first coordinate of the touch by the passive touch object proximate to the capacitive sense array in view of the first plurality of signal measurements.

19. The system of claim 18, wherein to scan the first plurality of electrodes, the processing device further configured to:
  configure a second plurality of electrodes along a second axis to a ground potential; and
  determine, at the first plurality of electrodes along the first axis, the first plurality of signal measurements corresponding to the capacitive coupling of the noise signal to the first plurality of electrodes through the passive touch object.

* * * * *